United States Patent
Matsumoto et al.

(10) Patent No.: US 8,142,690 B2
(45) Date of Patent: Mar. 27, 2012

(54) OPTICAL COMPONENT MOLDING APPARATUS AND METHOD THEREOF

(75) Inventors: Akihiko Matsumoto, Toyokawa (JP);
Atsushi Naito, Aichi-ken (JP);
Yoshihiro Okumura, Toyohashi (JP);
Kanji Sekihara, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 968 days.

(21) Appl. No.: 11/194,882

(22) Filed: Aug. 1, 2005

(65) Prior Publication Data
US 2006/0024403 A1  Feb. 2, 2006

(30) Foreign Application Priority Data
Aug. 2, 2004 (JP) ................... 2004-225728

(51) Int. Cl.
*B29D 11/00* (2006.01)
(52) U.S. Cl. ........................................ 264/1.1
(58) Field of Classification Search .............. 264/1.1; 425/149, 150, 577, 411, 415, 468
See application file for complete search history.

(56) References Cited

U.S. PATENT DOCUMENTS

| | | | |
|---|---|---|---|
| 4,184,835 A | 1/1980 | Talbot | |
| 4,828,769 A | 5/1989 | Maus et al. | |
| 4,840,553 A | 6/1989 | Arai | |
| 4,900,242 A * | 2/1990 | Maus et al. | 425/149 |
| 5,093,049 A * | 3/1992 | Uehara et al. | 264/2.2 |
| 5,288,222 A * | 2/1994 | Wieser | 425/190 |
| 5,750,060 A | 5/1998 | Maus et al. | |
| 6,210,610 B1 | 4/2001 | Saito et al. | |
| 6,824,382 B2 | 11/2004 | Ganz | |
| 2003/0222361 A1 * | 12/2003 | Suzuki et al. | 264/1.1 |

FOREIGN PATENT DOCUMENTS

| | | |
|---|---|---|
| CN | 87104162(A) | 12/1987 |
| JP | 59-53858 | 11/1979 |
| JP | 05-329905 | 12/1993 |
| JP | 06-039882 | 2/1994 |
| JP | 06-344108 | 12/1994 |
| JP | 09029854 A * | 2/1997 |
| JP | 10-193396 | 7/1998 |

(Continued)

OTHER PUBLICATIONS

Takeda, Y., "Lens made of resin for use in camera has at least central lens portion integrated and moulded by injection moulding, with outer peripheral surface of specified surface roughness", JP 09-029854 A Machine Translation, Feb. 4, 1997.*

(Continued)

*Primary Examiner* — Christina Johnson
*Assistant Examiner* — Galen Hauth
(74) *Attorney, Agent, or Firm* — Brinks Hofer Gilson & Lione

(57) ABSTRACT

A molding machine includes a fixed mold and a movable mold. The molding machine is a so called micro molding machine which provides less than 150 KN of the mold clamping force for clamping the fixed mold and the movable mold. A positional shift length between both molds is preset at ±20 gm or less. Further, cavities are inserted in base molds of both molds respectively. Furthermore, cores are inserted in the cavities. The position of each cavity is adjustable with respect to each associated base mold. The position of each core is also adjustable with respect to each associated cavity. Moreover, the molding machine can simultaneously mold a plurality of optical components.

30 Claims, 16 Drawing Sheets

FOREIGN PATENT DOCUMENTS

| JP | 10-193401 | 7/1998 |
|----|-----------|--------|
| JP | 11-042685 | 2/1999 |
| JP | 2000-042143 | 2/2000 |
| JP | 2000-218628 | 8/2000 |
| JP | 2001-124902 | 5/2001 |
| JP | 2001-166108 | 6/2001 |
| JP | 2001-272501 | 10/2001 |
| JP | 2002-011546 | 1/2002 |
| JP | 2002-240108 | 8/2002 |
| JP | 2002-321256 | 11/2002 |
| JP | 2003-114368 | 4/2003 |
| JP | 2003-145584 | 5/2003 |
| JP | 2003-245946 | 9/2003 |

OTHER PUBLICATIONS

Osswald, Tim, "Polymer Processing Fundamentals", 1998, Hanser Publishers, p. 70.*

International Search Report in International Application No. PCT/JP2005/013565, dated Oct. 18, 2005, in English and Japanese, 5 pages.

International Search Report PCT/JP2005/019099, dated Jan. 24, 2006.

First Office Action issued in U.S. Appl. No. 11/259,395 dated Oct. 4, 2006.

Second Office Action issued in U.S. Appl. No. 11/259,395 dated May 4, 2007.

Third Office Action issued in U.S. Appl. No. 11/259,395 dated Dec. 31, 2007.

Fourth Office Action issued in U.S. Appl. No. 11/259,395 dated Oct. 7, 2008.

Fifth Office Action issued in U.S. Appl. No. 11/259,395 dated Jun. 9, 2009.

Sixth Office Action issued in U.S. Appl. No. 11/259,395 dated Dec. 30, 2009.

Rees, "Understanding Injection Molding Design," pp. 59, 63-64.

Rosato et al., "Injection Molding Handbook," 3ed. 2000, pp. 251, 733-735, 738-739.

"Shaping System for Accurate Optical Elements," China Academic Journal Electronic Publishing House, vol. 17, Jun. 30, 2000.

Office Action dated Aug. 28, 2009 issued in related Chinese Patent Application No. 200580026172.5 (English translation included).

* cited by examiner

PL SURFACE

FIG.13

| VERTICAL ELASTIC COEFFICIENT | $2 \times 10^2$ GPa |
|---|---|
| POISSON RATIO | 0.31 |
| MOLD - HORIZONTAL | 170 (mm) |
| MOLD - VERTICAL | 170 (mm) |
| MOLD THICKNESS | 40 (mm) |

FIG.14

| CLAMPING FORCE (KN) | COMPRESSION STRESS (MPa) | VERTICAL STRAIN | HORIZONTAL STRAIN | MOLD - THICKNESS DIRECTION (μm) | OUTER CONFIGURATION DIRECTION (μm) |
|---|---|---|---|---|---|
| 0.5 | 1.7 | $8.48 \times 10^{-6}$ | $2.63 \times 10^{-6}$ | 0.34 | 0.45 |
| 1.0 | 3.4 | $1.70 \times 10^{-5}$ | $5.26 \times 10^{-6}$ | 0.68 | 0.89 |
| 1.5 | 5.1 | $2.54 \times 10^{-5}$ | $7.89 \times 10^{-6}$ | 1.02 | 1.34 |
| 2.0 | 6.8 | $3.39 \times 10^{-5}$ | $1.05 \times 10^{-5}$ | 1.36 | 1.79 |
| 3.0 | 10.2 | $5.09 \times 10^{-5}$ | $1.58 \times 10^{-5}$ | 2.04 | 2.68 |
| 5.0 | 16.9 | $8.48 \times 10^{-5}$ | $2.63 \times 10^{-5}$ | 3.39 | 4.47 |

| CHEMICAL FORMULA | STRUCTURE | REFRACTIVE INDEX (n) | ABBE'S NUMBER (v) |
|---|---|---|---|
| (1) |  | 1.49 | 58 |
| (2) |  | 1.54 | 56 |
| (3) |  | 1.53 | 57 |
| (4) |  | 1.51 | 58 |
| (5) |  | 1.52 | 57 |
| (6) |  | 1.54 | 55 |
| (7) |  | 1.53 | 57 |
| (8) |  | 1.55 | 57 |
| (9) |  | 1.54 | 57 |
| (10) |  | 1.55 | 58 |
| (11) |  | 1.55 | 53 |
| (12) |  | 1.54 | 55 |
| (13) |  | 1.54 | 56 |
| (14) |  | 1.58 | 43 |

OPTICAL COMPONENT MOLDING APPARATUS AND METHOD THEREOF

CROSS-REFERENCE TO RELATED APPLICATIONS

This application is based upon and claims the benefit of priority from the prior Japanese Patent Application No. 2004 225728 filed on Aug. 2, 2004, the entire contents of which are incorporated herein by reference.

BACKGROUND OF THE INVENTION

1. Field of the Invention

The present invention relates to an optical component molding apparatus and molding method for injection molding of a high precision optical component. In particular, the present invention relates to a molding apparatus and a method for an optical component capable of reducing the molding time period, increasing the production efficiency and reducing the cost and the like using a smaller molding machine.

2. Description of Related Art

Recently, optical components such as objective lens are formed in a manner of injection molding using a plastic resin (refer to, for example, Patent Document 1 and Patent Document 2). Since, by molding optical components using a plastic, products of uniform configuration can be produced quickly, the molding is suitable for mass production thereof.

For example, as shown in FIG. 3, the molds for molding a plastic lens include a fixed mold 1 and a movable mold 2 capable of being brought into close contact with the fixed mold 1 and separated away therefrom. When the fixed mold 1 and the movable mold 2 are brought into close contact with each other, a void part 50 is formed. In a state that the both molds are in a close contact with each other, molten resin is injected into the void part 50 via a runner 52 and a gate 51 in this order. After the resin has solidified, the movable mold 2 is separated away from the fixed mold 1, and a molded item of a plastic lens is ejected and demolded. Thus, a plurality of plastic lenses are formed simultaneously.

Optical instruments utilizing the plastic lens have a tendency toward miniaturization and higher performance from year to year. Accompanying this, requests for miniaturization and higher precision of the plastic lens are also increasing.

Conventionally, for example, an optical pick up device is used 10 for recording/reading with a CD (Compact Disk) only. However, the application of the optical pick up device has expanded to compatibility between DVDs (Digital Versatile Disc) and CDs; and further, to the recording to DVDs (Digital Versatile Disc) and CDs. Recently, a standard of optical information recording medium, which enables information recording of higher density, is now under research and development. That is, an optical disk, which is capable of high density recording using a blue light of around 400 nm in wavelength, has been proposed. To achieve this, an objective lens of around 0.85 in number of aperture (NA) is required. Also, recently, in order to compensate spherical aberration, color aberration, temperature characteristics or the like, a minute structure such as diffraction grating is provided on the optical surface. And further, accompanying the miniaturization of the pick up device, the optical component itself has tended toward miniaturization.

As for an imaging optical system, a so called digital imaging device using an imaging optical element has been widely used. For example, the digital imaging device is used in video cameras, digital still cameras and the like. Particularly, a small size camera unit mounted on a portable electronic instrument such as a cellular phone is widely used. As for imaging devices mounted on these imaging instruments, CMOS (Complementary MOS) and CCD (Charge Coupled Device) are well known. These devices have also tended toward high density pixels and required accuracy levels for the imaging optical element have also been increasing.

[Patent Document 1] Japanese Published Unexamined Patent Application No. H11 42685, mold clamping force: 500 KN

[Patent Document 2] Japanese Published Unexamined Patent Application No. 2001 272501, mold clamping force: 300 KN However, the following problems reside in the conventional molding apparatus. That is, conventionally, as the molding apparatus of optical components, relatively large size molding machines, in which the molds are brought into close contact with each other with a mold clamping force of a 300 KN to 500 KN class were used. Therefore, the strain of the molds is large when the molds are brought into close contact with each other and separated away therefrom. Accordingly, there arise the following problems. That is, a surface shift which is a displacement of the lens surface in the direction perpendicular to the optical axis a tilt which is an angular displacement of the lens surface with respect to the optical axis. Particularly, in the case of optical components, which require high precision, the occurrence of surface shift or tilt, etc. has large effect to the optical characteristics. Further, when the mold clamping force is large, the load against the molds is also large. Therefore, the molds tend to be deformed resulting in a molding failure.

Further, in a molding machine of which the clamping force is the 300 KN to 500 KN class, the clamping section becomes large in size. Also since a large amount of resin is required for injection, generally, the plasticization section and the injecting section are also large in size. In the case where a small item is molded using such a large machine, since the injection resolution is poor, fine adjustment of the molding conditions is hardly carried out. As a result, a transfer failure occasionally occurs. Further, since the size of the apparatus is large, a large installation space is required. There reside many factors of high cost such that a large power for driving the molding machine is required etc.

SUMMARY OF THE INVENTION

The present invention has been proposed to solve the above mentioned problems residing in the conventional molding apparatus of optical components. That is, an object of the present invention is to provide a molding apparatus and a molding method of optical components, which is capable of efficiently molding resin optical components with a high precision.

According to a first aspect of the present invention, there is provided an optical component molding apparatus comprising: a fixed mold; and a movable mold provided to contact with and to separate from the fixed mold; the fixed mold and the movable mold being to be brought into contact with each other by a mold clamping force within a range of 2 KN to 150 KN, providing a void between the molds into which a resin material is to be injected to simultaneously form a plurality of optical components each of which has an outer diameter of 12 mm or less and an optical surface having a surface roughness of Ra 20 nm or less.

According to a second aspect of the present invention, there is provided an optical component molding method comprising: clamping a fixed mold and a movable mold by bringing the molds into close contact with each other by a mold clamping force within 2 KN to 150 KN; injecting a resin material into a void between the molds; and separating the fixed mold and the movable mold away from each other to take out an optical component, thereby forming a plurality of optical components each of which has an outer diameter of 12 mm or less and an optical surface having a surface roughness of Ra 20 nm or less.

That is, by means of the present invention, optical components are molded by filling a void formed between the molds with resin material. That is, the optical component is molded by means of injection molding of resin material. As for an optical component as an item to be molded of which the outer diameter is 12 mm or less the surface roughness Ra of the optical surface is 20 nm or less. This optical component is used in, for example, an optical pick up device or a cellular phone with a camera function. The application of the optical component is not limited to an optical pick up system or imaging optical system, but may be applied to, for example, a finder optical system.

According to the present invention, the mold clamping force for bringing the molds at the movable side and fixed side into close contact with each other is within a range of 2 KN to 150 KN. Compared with a molding machine of the 500 KN class, the space required for installing the molding machine is smaller resulting in energy saving and space saving. Accordingly, the molding time and resin amount can be reduced resulting in a cost reduction. Further, since the clamping force of the molds is small, the strain of the molds when clamping and separating away the molds is small. Accordingly, the surface shift or the tilt can be prevented. Thus, the molding apparatus of optical component is capable of efficiently molding a resin optical component with high precision.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 13 is a table showing mold size related to each pressure in a clamping force study;

FIG. 14 is a table showing results of an examination for clamping force about an amount of strain;

DETAILED DESCRIPTION OF THE PREFERRED EMBODIMENTS

Hereinafter, embodiments, in which the present invention is embodied, will be described in detail with reference to the accompanying drawings. This embodiment is a molding machine for a plastic lens mounted on an optical pick up device or imaging optical system, to which the present invention is applied.

Figure 1:
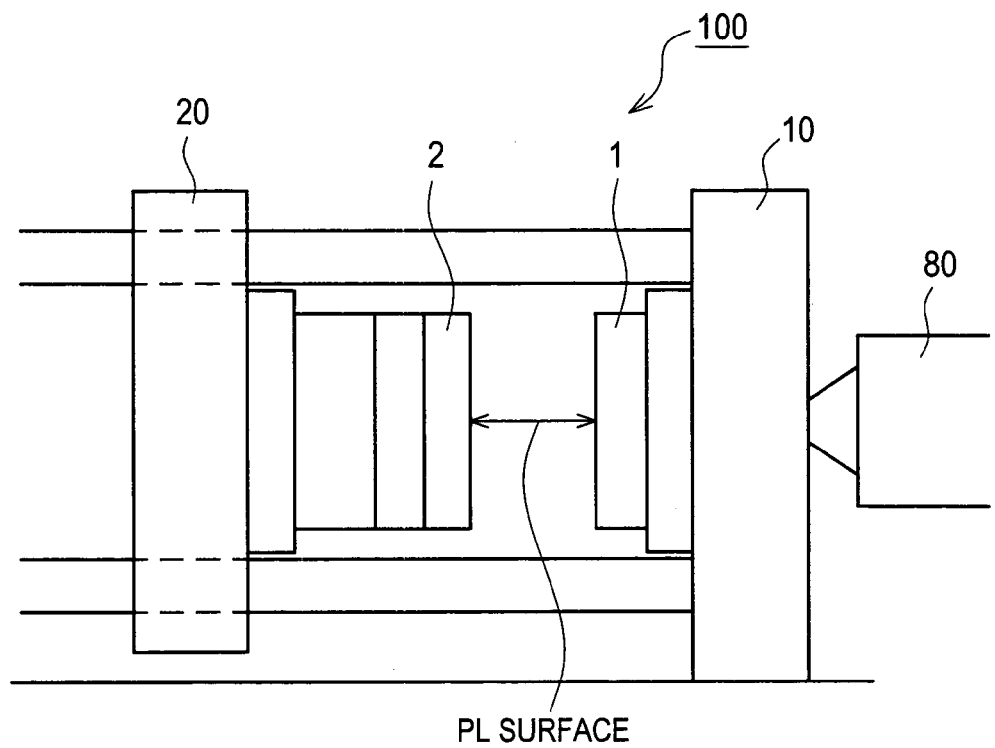
FIG. 1 is a view schematically showing a structure (that molds are in a separated state) of a plastic lens molding machine in a preferred embodiment.
Figure 2:
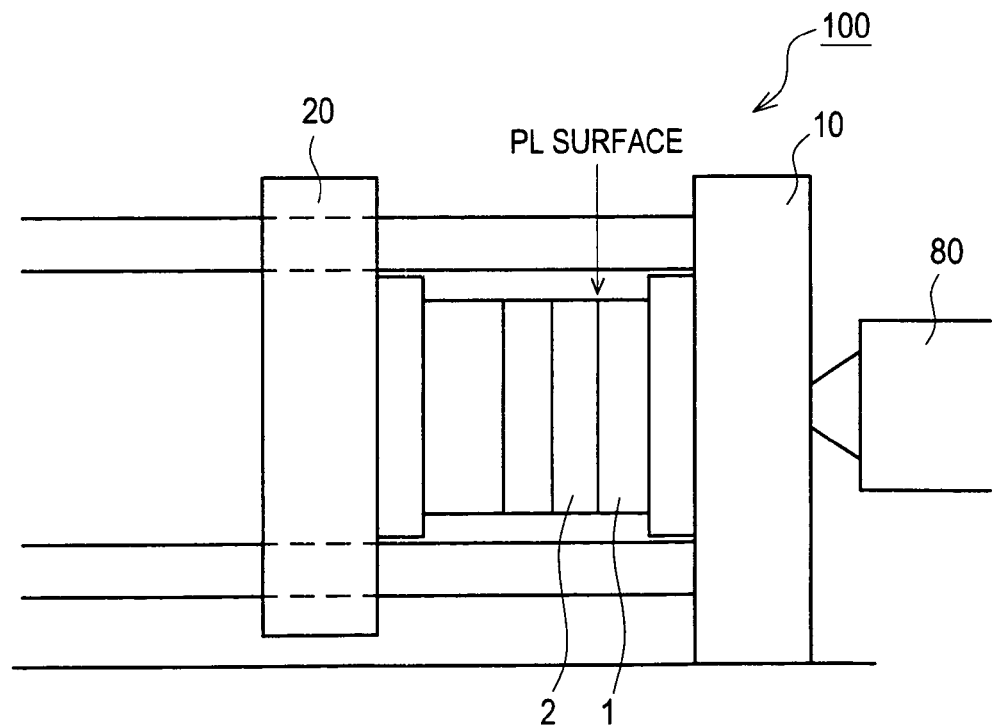
FIG. 2 is a view schematically showing the structure (that the molds are in a contact state under pressure) of the plastic lens molding machine in the embodiment.
Figure 3:
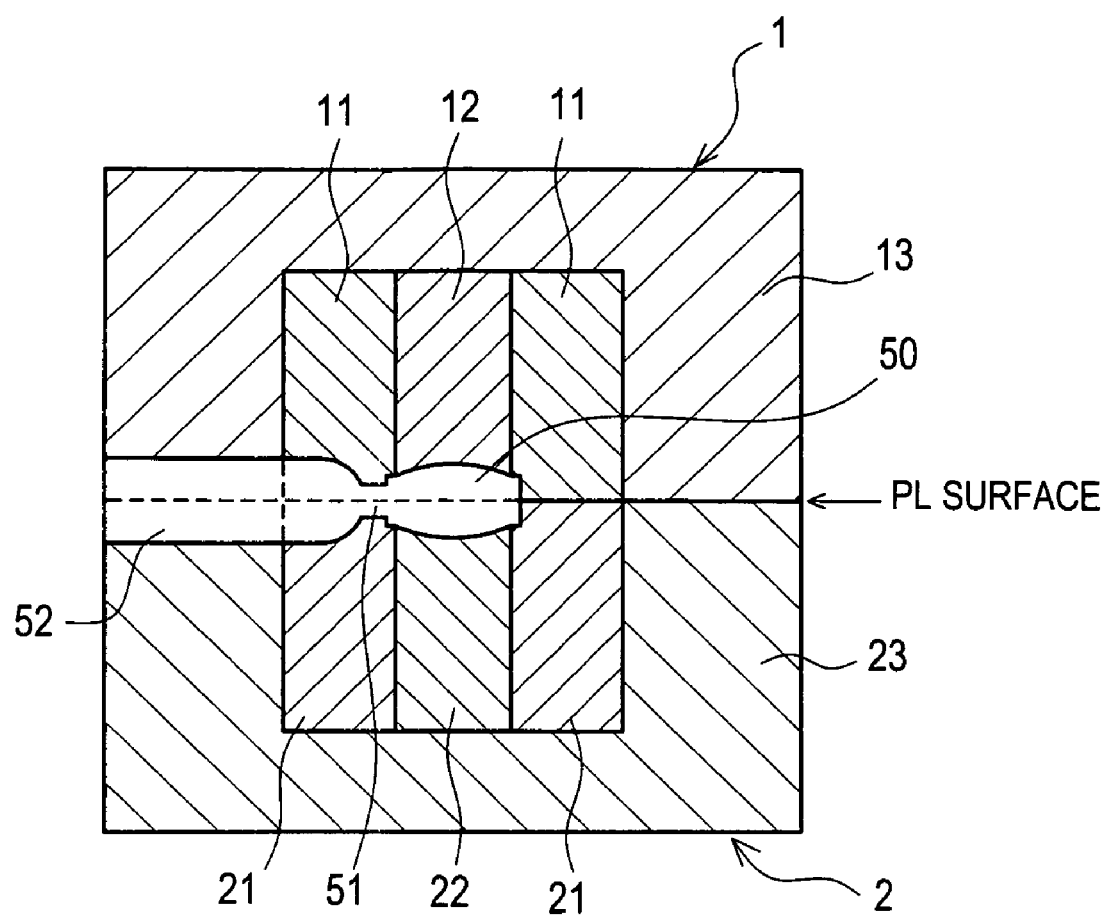
FIG. 3 is a sectional view schematically showing the structure of the molds for the plastic lens.

FIG. 1 and FIG. 2 are views schematically showing the structure of a molding machine 100 in accordance with the embodiment. FIG. 1 shows a state in which the molds are separated away from each other. FIG. 2 shows a state in which the molds are brought into close contact with each other. FIG. 3 schematically shows the structure of the Molds of the embodiment.

In particular, the molding machine 100 for a plastic lens of the embodiment includes, as shown FIG. 1 and FIG. 2, a fixed platen 10 equipped with a fixed mold 1 and a movable platen 20 equipped with a movable mold 2, which is brought into close contact with and separated away from the fixed mold 1. The size of the contact face of the both molds is 200 mm in the perpendicular direction and 200 mm in the horizontal direction. Also, as shown in FIG. 3, in a base mold 13 of the fixed mold 1, a cavity 11 is inserted and further, in the cavity 11, a core 12 is inserted. Further, in the same manner, in a base mold 23 of the movable mold 2, a cavity 21 is inserted and further, in the cavity 21, a core 22 is inserted. That is, the cavity and the core are structured as a bushing of the base mold, respectively. In this specification, a member in which a shape-transferring section is formed for forming the optical surface of a plastic lens will be referred to as the "core"; and a member, in which a shape transferring section for forming a flange section positioned at the periphery of the optical surface is formed, will be referred to as the "cavity."

As for the configuration of the core, there can be a minute configuration such as an optical path difference imparting structure, a configuration of a non-spherical surface shape, a configuration of non-rotational symmetry with respect to the optical axis such as a beam shaper, etc. and combination thereof. In this specification, the "optical-path difference imparting structure" means a structure constituted of a central area including the optical axis and a plurality of circular zones segmented with minute steps outside the central area, which has the following characteristics. That is, at a predetermined temperature, between the neighboring circular zones, the optical path difference of the integral multiple of the wavelength of an incoming beam is generated, and when the temperature changes from the predetermined temperature, accompanying the changes in the refractive index, the optical path difference generated between the neighboring circular zones displaces from the integral multiple of the wavelength of the incoming beam. The particular structure of the "optical path difference imparting structure" is a structure as described below. That is, for example, the circular zone neighboring outside the central area is formed being displaced in the direction of the optical axis so that the optical length is elongated with respect to the central area the circular zones within the maximum effective diameter position are formed being displaced in the direction of the optical axis so that the optical length is elongated with respect to the circular zone neighboring the outside thereof, and the circular zones within the position of 75% of the maximum effective diameter are formed being displaced in the direction of the optical axis so that the optical length is shortened with respect to the circular zone neighboring the inside thereof and the circular zone neighboring the outside thereof. Here, the "central area" means an optically functional area encircled by the step at the nearest position from the optical axis including the optical axis.

Preferably, the surface of the shape transferring section of the shape transferring member (core or cavity) should be processed with metal plating. The thickness of the metal plating layer is appropriately determined within to 100 µm. Also, when the optical path difference imparting structure is formed, it is preferable that the structure is formed too by scraping off the plating layer partially. Further, for increasing the mold-releasing performance and for protecting the mold, a protection coating may be formed using diamond like carbon (DLC), etc. Owing to this, when carrying out the molding and shape transferring, the flowability of the resin within the mold and the mold releasing performance, when the molded item is taken out from the mold, is increased.

In this embodiment, 4 to 32 molded items can be produced by one mold clamping. That is, a mold for multi molding is used. In the molding machine 100 of the embodiment, the mold for molding a plastic lens is separated into the core and the cavity, but not limited to the above. That is, the core and the cavity may be integrated (shape transferring section for the optical surface and the shape transferring section for the flange section are integrated). Examples of disposition of the core and the cavity will be described later.

The molding machine 100 of the embodiment is arranged so that the movable platen 20 moves toward the fixed platen 10, and the fixed mold 1 and the movable mold 2 are brought into close contact with each other, thereby a void part 50 is formed between the two molds (refer to FIG. 3). The molding clamping force between the fixed mold 1 and the movable mold 2 is within a range of 2 KN to 150 KN.

Also, in the molding machine 100 of the embodiment, when the movable mold 2 is separated away from the fixed mold 1, and then the both are again brought into close contact with each other, the maximum value of positional shift length (positional displacement) between the two molds in the direction perpendicular to the clamping direction is preset to ±20 µm or less. To set the maximum value of the positional shift length of the mold to ±20 µm or less, the following methods are available. That is, for example, the rigidity of the movable platen, the fixed platen and tie bars or the accuracy of assembly and adjustment are improved and the like.

In the molding machine 100 of the embodiment, in a state that the two molds are brought into close contact with each other, molten resin is injected into the void part 50 from an injection molding machine 80 via a runner 52 and a gate 51 in this order. After the resin in the molds has solidified, the movable mold 2 is separated away from the fixed mold 1, and then molded item 30 of plastic lens is ejected and demolded. In the molded item 30 after demolding, in addition to the plastic lens main body, a flange section located on the periphery of the optical surface of the plastic lenses and a portion corresponding to the runner 52 and gate 51 are formed integrally. By cutting at the portion corresponding to the gate 51 in the later cutting process, the plastic lenses are obtained.

As for the molding conditions of the plastic lens, for example, in the case where an amorphous polyolefin resin is used as the molten resin, the temperature of the molds is 120° C.; the temperature of the resin is 280° C.; the injection speed is 50 mm/sec; the hold pressure is 100 MPa; and the cooling period of time is 30 sec.

As for the plastic resin used in the molding machine 100 of the embodiment, a transparent resin material, which is ordinarily used as an optical material, may be employed. For example, preferably, appropriate resins set forth in Japanese Patent Application No. 2004 144951, Japanese Patent Application No. 2004 144953, Japanese Patent Application No. 2004 144954 and the like may be employed. In particular, acrylic resin, cyclic olefin resin, polycarbonate resin, polyester resin, polyether resin, polyamide resin, polyimide resin and the like are given.

The refractive index of the plastic resin decreases as the temperature rises, but the refractive index of most of the inorganic particles increases as the temperature rises. Here, there is known a technique to prevent the refractive index from changing by causing the above two characteristics to act so as to negate each other. For the above purpose, inorganic particles of 30 nm or less, preferably, 20 nm or less, further preferably, within a range of 10 to 15 nm are dispersed in the resin as the base material. Appropriate examples of the plastic resin used for the plastic lens and the inorganic particles to be added to the resin will be given later.

Figure 4:
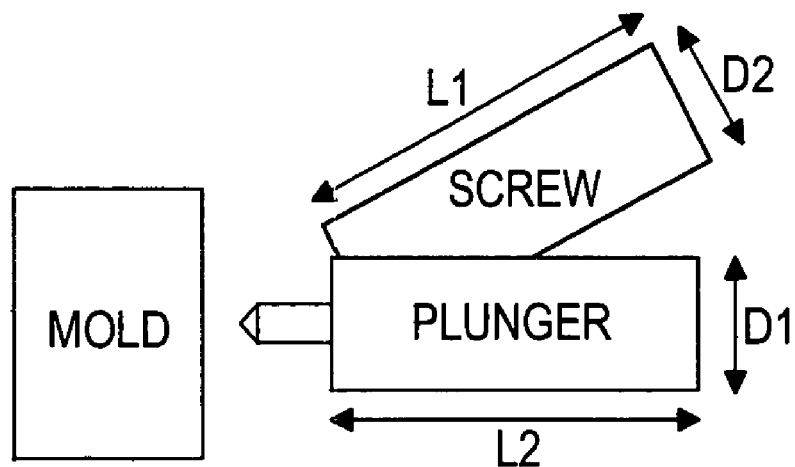
FIG. 4 is a view schematically showing a structure of a pre-plasticating type injection part.
Figure 5:
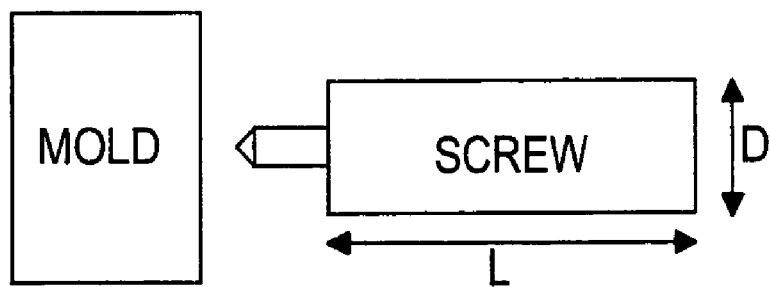
FIG. 5 is a view schematically showing a structure of an in line screw type injection part.

The fixed platen 10 is provided with an injection port of the molten resin, and the resin is injected into the mold by the injecting section 80. As for the injecting section 80, a pre-plasticating type injection machine (refer to FIG. 4) or an in line screw type injection machine (refer to FIG. 5) may be employed. As for the specifications of the injecting section 80, for example, in the case of the pre-plasticating type injection machine, the diameter of the screw is 10 to 30 mm; the diameter of the plunger is 8 to 20 mm; L/D (a ratio calculated by dividing an effective length L of the screw by an outer diameter D of the screw) is 20 to 30; and the compression ratio is 2 to 3. On the other hand, in the case of the in line screw type injection machine, the diameter of the screw is 10 to 20 mm; the L/D is 20 to 30; and the compression ratio is 2 to 3.

In any case of the pre-plasticating type injection machine or in line screw type injection machine, by selecting a screw of a smaller diameter, the injection resolution is increased, and thus the molding conditions can be controlled minutely. In the pre-plasticating type injection machine, by separating the plasticization section (screw) from the injecting section (plunger) of the resin, the plasticization of the resin is stabilized, and the molten state of the resin to be injected is stabilized accordingly. Further, since the measurement and injection of the resin are made using the plunger, compared with the in line screw type injection machine, the accuracy of the measurement and injection is excellent.

Further, in the molding machine 100 of the embodiment, positional adjustment between the cavity and the base mold or between the core and the cavity is possible. Here, the positional adjustment between the cavity and the base mold will be described. In the base mold, a space (concavity) slightly wider than the cavity for receiving the cavity is formed. The cavity is fixed by inserting a spacer block into a gap between the cavity and the base mold, which is generated when the cavity is received.

Figure 6:
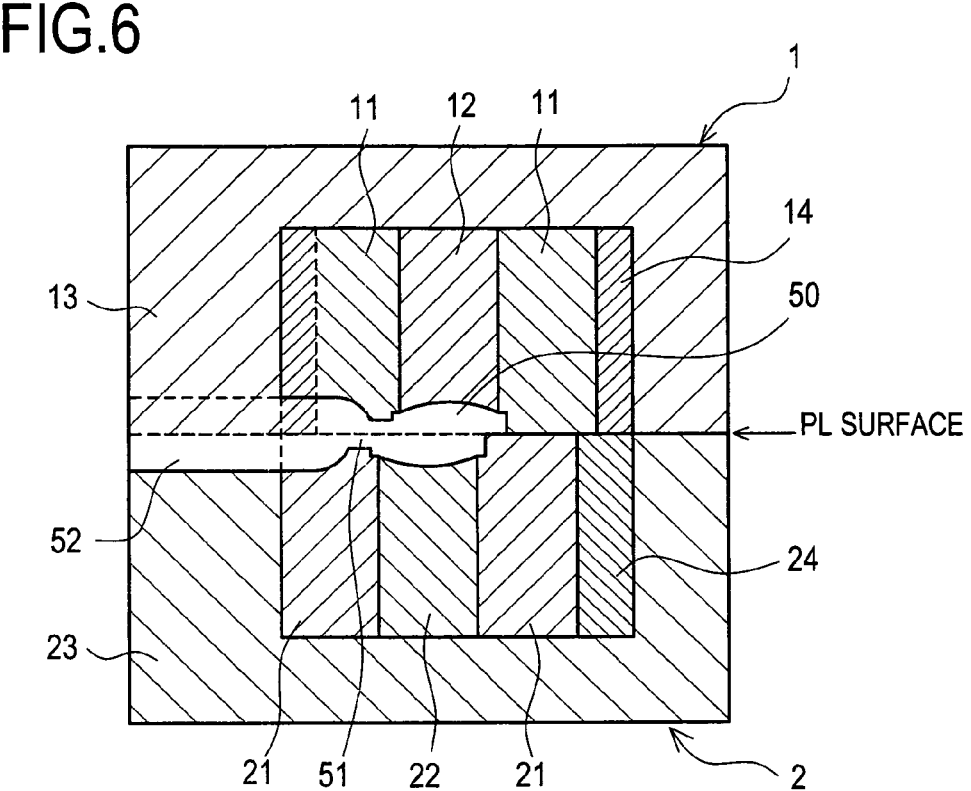
FIG. 6 is a view schematically showing a positional adjustment mechanism of a cavity (before adjustment)
Figure 7:
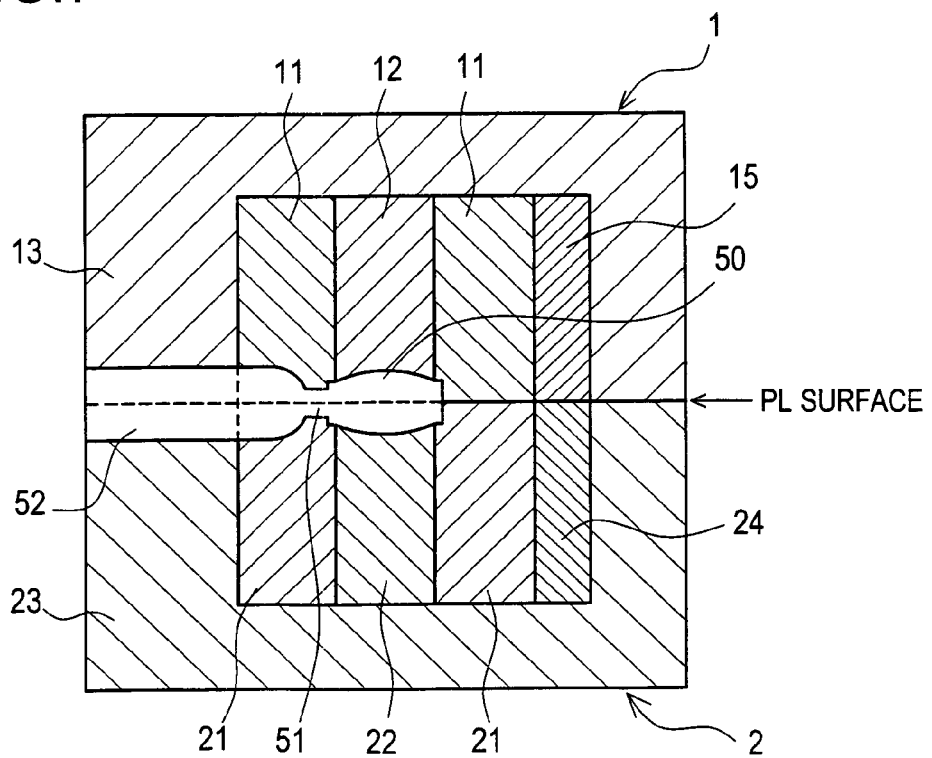
FIG. 7 is a view schematically showing the positional adjustment mechanism of the cavity (after adjustment)

FIG. 6 shows the molds in the case where a displacement is generated between the optical axis of the optical surface at the fixed mold 1 side and the optical axis of the optical surface at the movable mold 2 side. The reason for this is, compared with the same portion in the cavity 21 at the movable mold 2 side, the width of the member at the gate 51 side in the cavity 11 at the fixed mold 1 side is larger. Therefore, the cavity 11 at the fixed mold 1 side is ground off equivalent to the shift length (a dot hatched portion in FIG. 6) by way of grinding or the like. And then, in the space after grinding, another spacer block 15 is inserted as shown in FIG. 7; thereby the displacement is corrected.

The plastic lens as the item to be molded is a lens of which the diameter is 12 mm or less and the surface roughness of the optical surface is Ra 20 nm or less. The plastic lens is utilized in an optical pick up system for an optical pick up device or the like, or in an imaging optical system for a cellular phone with a camera function or the like. Examples of application of the plastic lens to an optical pick up device will be described later.

Next, the structure of the core and the cavity in the fixed mold 1 and the movable mold 2 will be given being classified into five patterns. The following patterns are given as an example only, and the structure of 1 the core and the cavity is not limited to the following five patterns.

Figure 8:
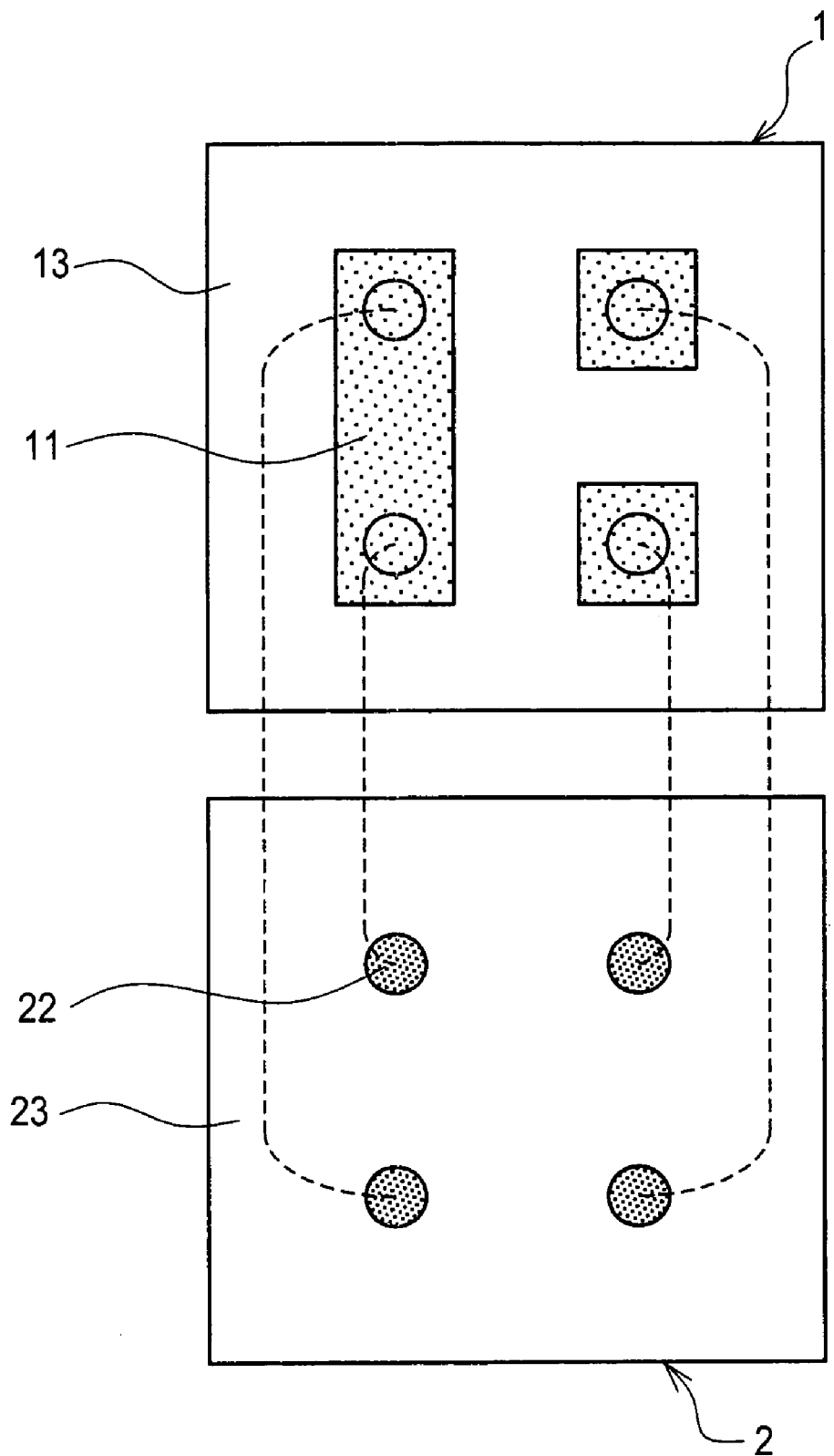
FIG. 8 is a view showing a first pattern (one of molds has a positional adjustment function) of configurations of a core and a cavity.

The first pattern has the following structure. That is, as shown in FIG. 8, the fixed mold 1 is provided with the mold 11 integrated with the core and the cavity (i.e., a cavity directly carved with a shape transferring section corresponding to the optical surface), and the movable mold 21s provided with a core 22 only. In the first pattern, the cavity 11 is directly carved with the shape transferring section for the optical surface. Therefore, the displacement of the optical axis between the front surface and the rear surface with respect to the outer configuration of the plastic lens product (hereinafter, the displacement will be referred to as "outer configuration decentration") is adjusted when the mold is processed. On the other hand, the core 22 is provided to the base mold 23 so as to be adjustable in its position. The displacement of the optical axis between the surface and the. rear surface of the plastic lens (hereinafter, this displacement will be referred to as "face to face decentration") is adjusted when the core 22 is inserted. That is, the movable mold 2 side has no relation with the adjustment of the outer configuration decentration. Also, in the first pattern, a plurality of optical surfaces are formed on the cavity 11, thereby the number of parts can be reduced. In the fixed mold of the first pattern, the base mold 13 corresponds to a face mode of the invention and the cavity 11 corresponds to a transferring member of the invention. In the movable mold 2 of the first pattern, the base mold 23 corresponds to the face mold and the core 22 corresponds to the transferring member.

The structure of the fixed mold 1 and the movable mold 2 may be reversed with each other. That is, a mold integrally formed with the core and the cavity may be provided to the movable mold 2, and only the core may be provided to the fixed mold 1. The above is the same in the following patterns.

Figure 9:
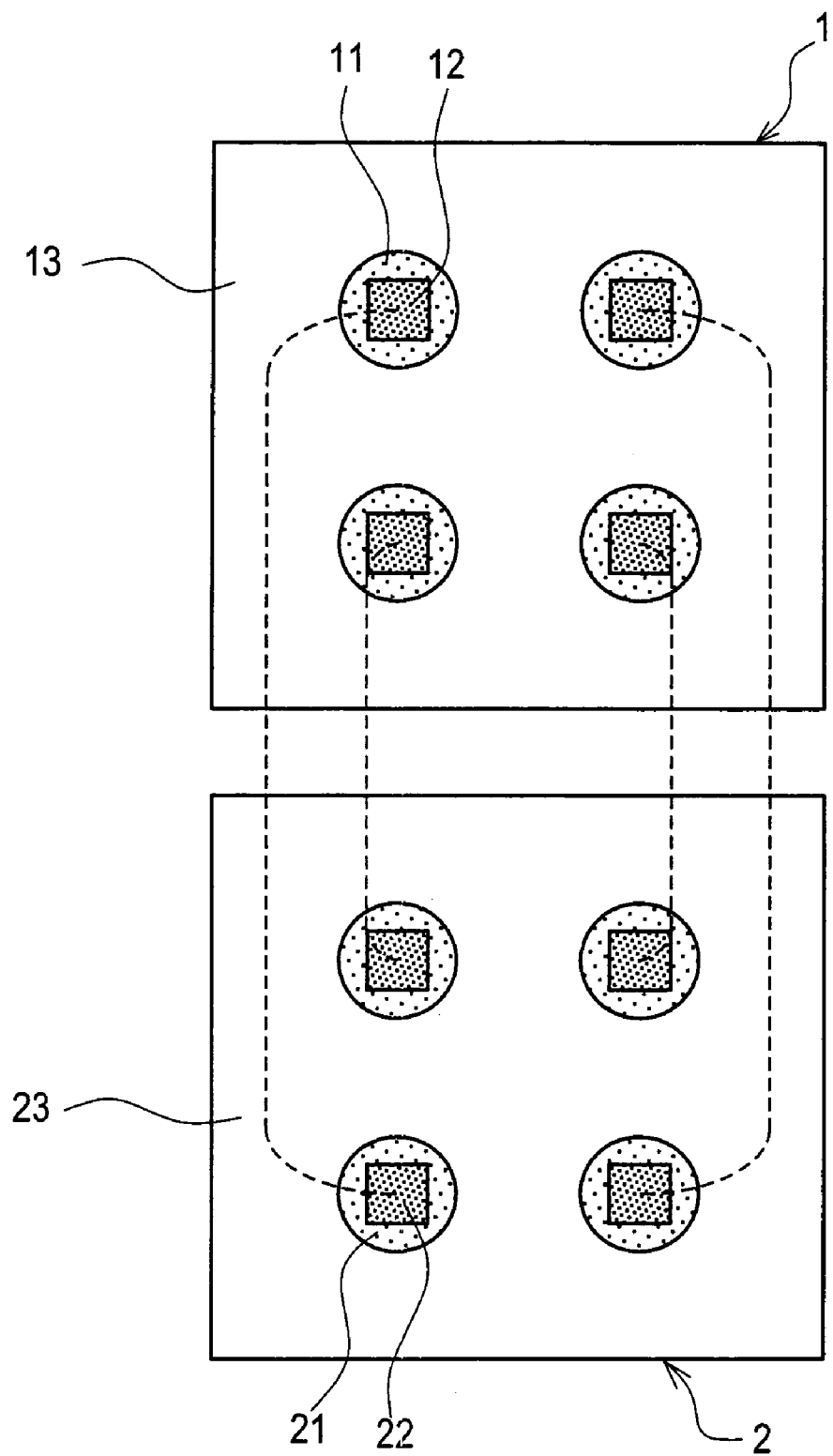
FIG. 9 is a view showing a second pattern (each mold has a positional adjustment function) of the configurations of the core and the cavity.

The second pattern has the following structure. That is, as shown in FIG. 9, both of the fixed mold 1 and the movable mold 2 are provided with the cavity (11 and 21) and the core (12 and 22), and further, the portion corresponding to one optical component is provided with one each of the core and the cavity. In the second pattern, all of the cavities and the cores are adjustable in their positions respectively thus, the degree of freedom of positional adjustment is larger. Further, since one of each of the core and the cavity are provided for one optical surface, various combinations corresponding to various types of the product are easily available. In the fixed mold 1 and the movable mold 2 of the second pattern, the cavities 11 and 21 correspond to the face mold of the invention and the cores 12 and 22 corresponds to the transferring member of the invention.

The core may be circular or rectangular in its configuration. In the case of circular configuration, every process is made in a manner of axial symmetry processing. Therefore, simultaneous processing can be easily carried out with high precision. Particularly, the displacement can be corrected advantageously. On the other hand, in the case of rectangular configuration, decentration adjustment is easily carried out by the two orthogonal axes. Further, the cavity may be circular or rectangular in its configuration. In the case where the cavity is rectangular configuration, when adjusting the face to face decentration, the calculation of the adjusting amount and adjustment thereof can be carried out easily.

Figure 10:
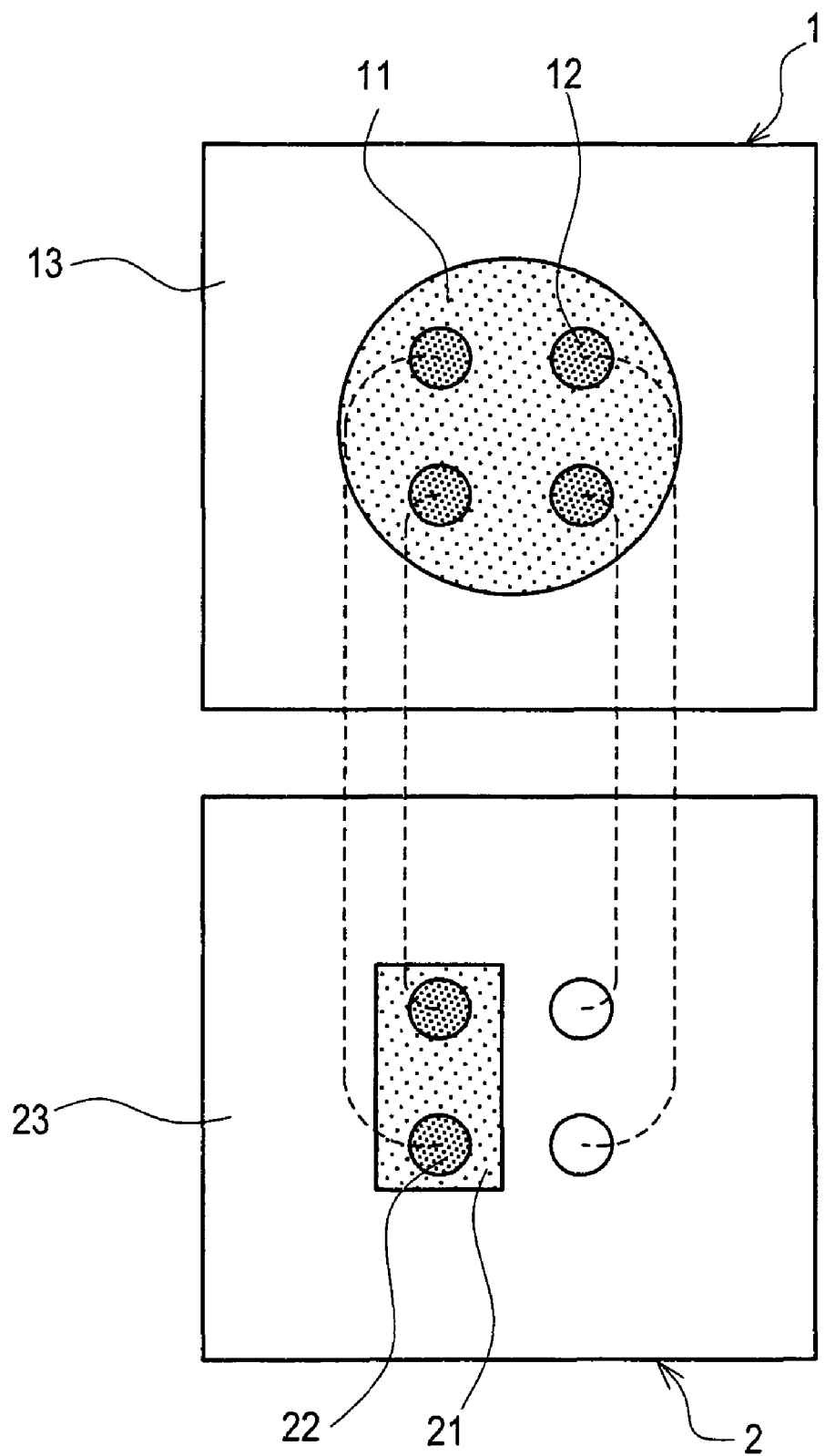
FIG. 10 is a view showing a third pattern (one cavity has a plurality of cores) of the configurations of the core and the cavity.

As shown in FIG. 10, the third pattern has a structure such that a plurality of cores 12 is inserted into one cavity 11. In the third pattern, the disposition and structure of the cavity are simplified the number of parts is reduced and the positional adjustment is simplified. Further, since the distance between the cores 12 and 12 is small, the amount of resin required for the runner and the like can be reduced.

Figure 11:
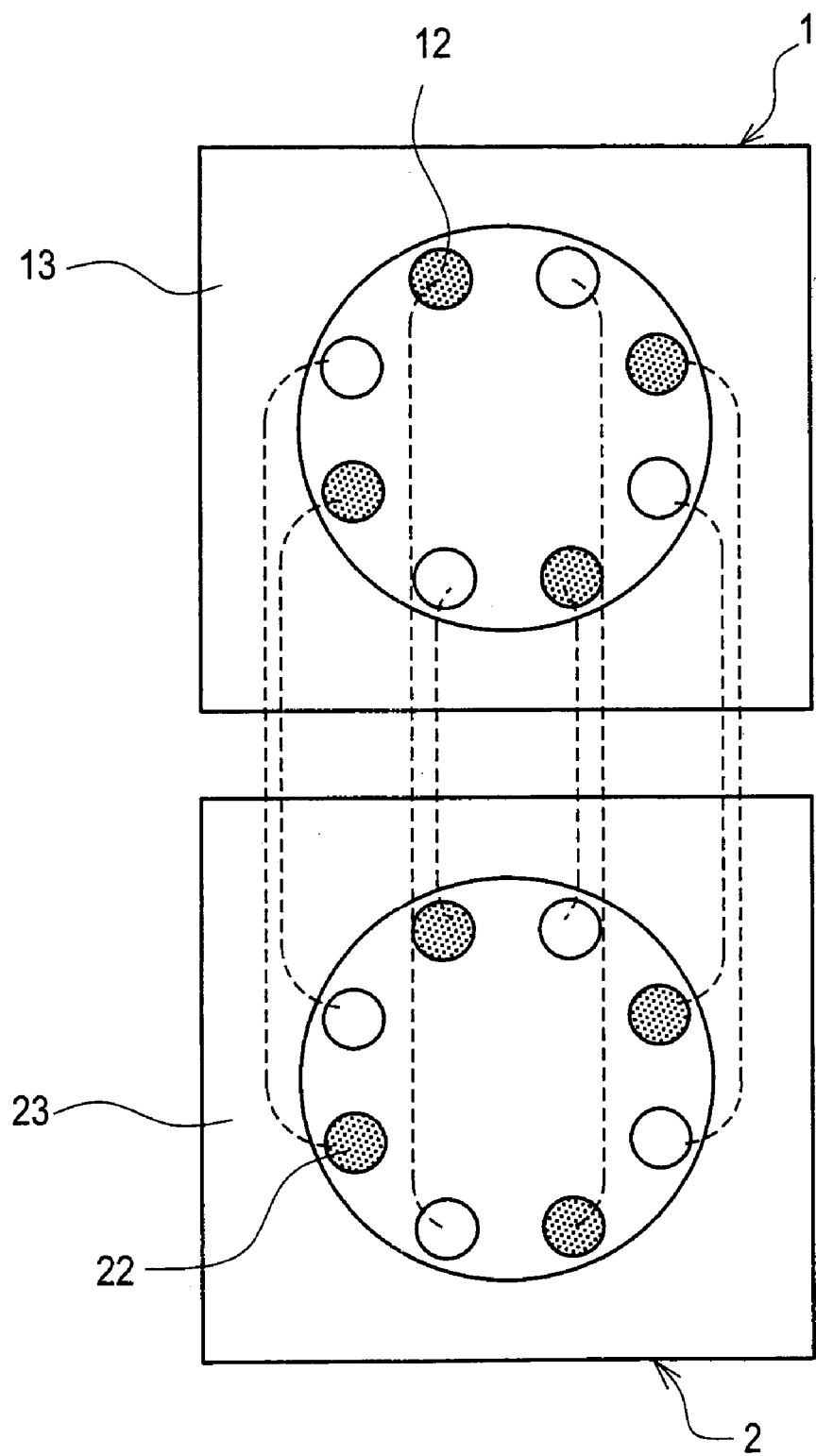
FIG. 11 is a view showing a fourth pattern (no cavity) of the configurations of the core and the cavity.

As shown in FIG. 11, the fourth pattern has a structure having the fixed mold 1 and the movable mold 2 both without a cavity. Therefore, compared with the third pattern, the number of parts is further reduced and also the positional adjustment is further simplified. Furthermore, since the distance between the cores is small, the base molds 13 and. 23 can be miniaturized and the number of moldings can further be increased.

Figure 12:
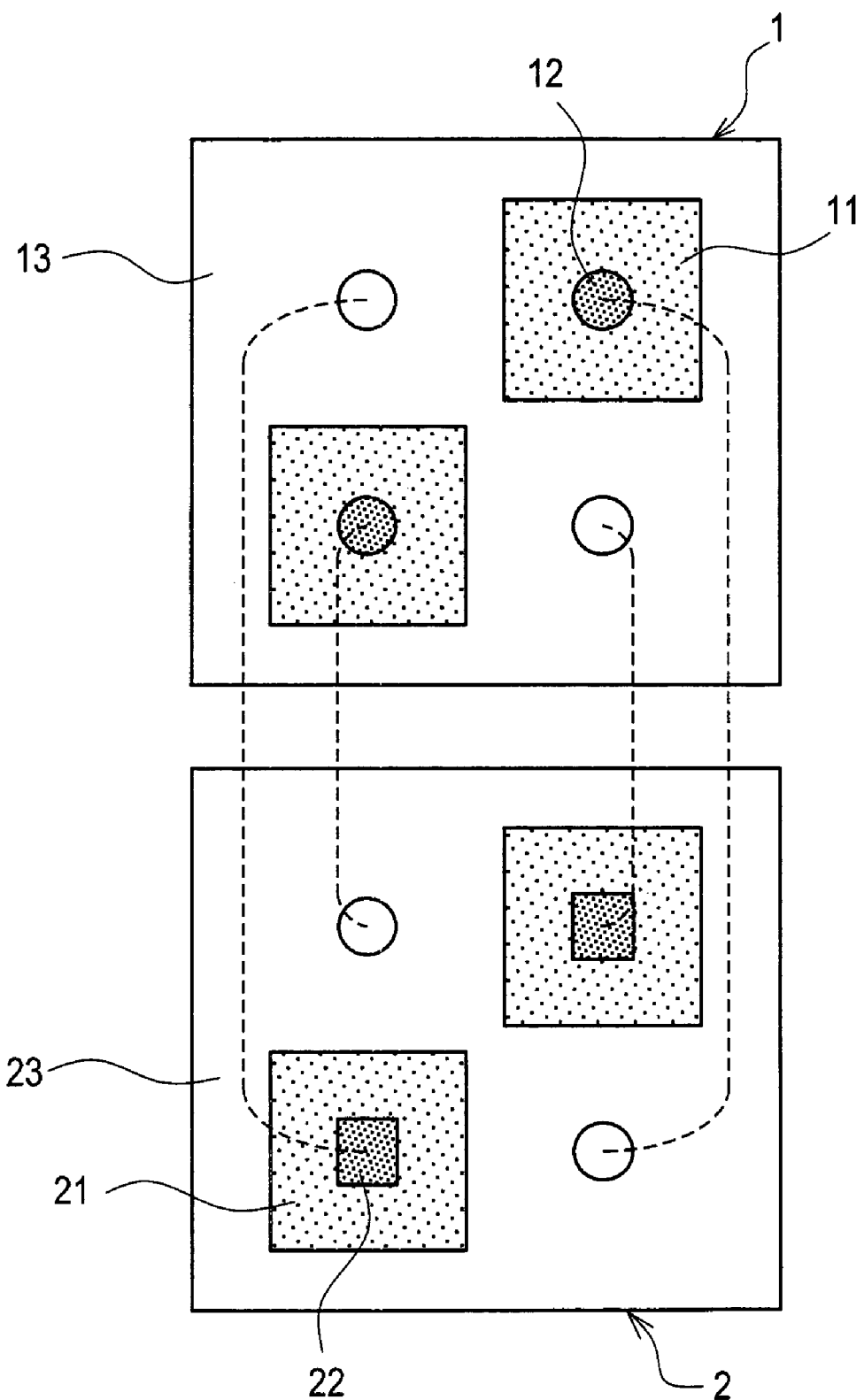
FIG. 12 is a view showing a fifth pattern (either one of a pair of cores has the positional adjustment function) of the configurations of the core and the cavity.

As shown in FIG. 12, the fifth pattern has a structure in which the presence or absence of a positional adjustment mechanism is provided by arranging the fixed mold 1 and the movable mold 2 in a zigzag manner. Therefore, the degree of freedom of the dimension of the cavity provided to the respective molds is larger.

Next, the examination result of the influence to the strain in the molds on the basis of magnitude of the mold clamping force using the molding machine for the plastic lens will be described below. FIG. 13 shows the size of the mold used in the examination. In this examination, it was assumed that no relative displacement was generated between the fixed mold and the movable mold. FIG. 14 shows the result of the examination.

It was found that, when the molding was carried out with a mold clamping force of 150 KN or less, the amount of strain in the mold thickness direction (direction in the thickness of the mold) was 1 μm or less. On the other hand, it was found that when the molding was carried out with a mold clamping force of 500 KN or more, the amount of strain in the mold thickness direction was 3 μm or more. That is, compared with the molding machine of the 150 KN class, the molding machine of the 500 KN class generated a strain 3 times or more as large as in the mold thickness direction. It was found that it was advantageous to use the molding machine of the 150 KN class.

Also, it was found that, when the molding was carried out with a mold clamping force of 150 KN or less, the amount of strain in the outer configuration direction (displacement direction with respect to the direction perpendicular to the clamping direction) was 1.5 µm or less. On the other hand, it was found that, when the molding was carried out with a mold clamping force of 500 KN or more, the amount of strain in the outer configuration direction was 4 µm or more. As for the strain, when a positioning mechanism (taper block, taper pin, etc., for PL surface) can be used between the fixed mold 1 and the movable mold 2, the binding point is identical. However, actually, it is difficult to adjust a plurality of binding points in µm order; the strain is a cause of axial displacement.

Also, since the strain is generated at mold clamping and released at opening the molds, the optical surface of the molded item is occasionally scratched when the molds are opened. Therefore, this phenomenon gives a large influence to the optical element, which has a minute structure on its surface (diffraction optical lens, Fresnel lens, etc.). In these plastic lenses, the displacement due to the strain leads to a configurational deformation and thus, causes the degradation of the optical characteristics. The larger the amount of strain and the more minute the configuration of the surface; the larger the degradation of the optical characteristics resulted. It was found that, in this point also, it was advantageous to use a molding machine of the 150 KN class.

Next, the examination result of the influence on the optical characteristics in the plastic lens on the basis of the magnitude of the axial displacement of the optical axis will be described. When a ray of point light source enters into a lens, of which optical axes coincide with each other between the lens surfaces, the output ray of light focuses into an image on a plane perpendicular to the optical axis. On the other hand, when the optical axes do not coincide with each other between the lens surfaces, the input ray of light focuses into an image on a plane inclined with respect to the optical axis. In this examination, the amount of displacement to one side (partial displacement amount) was measured.

Figure 15:
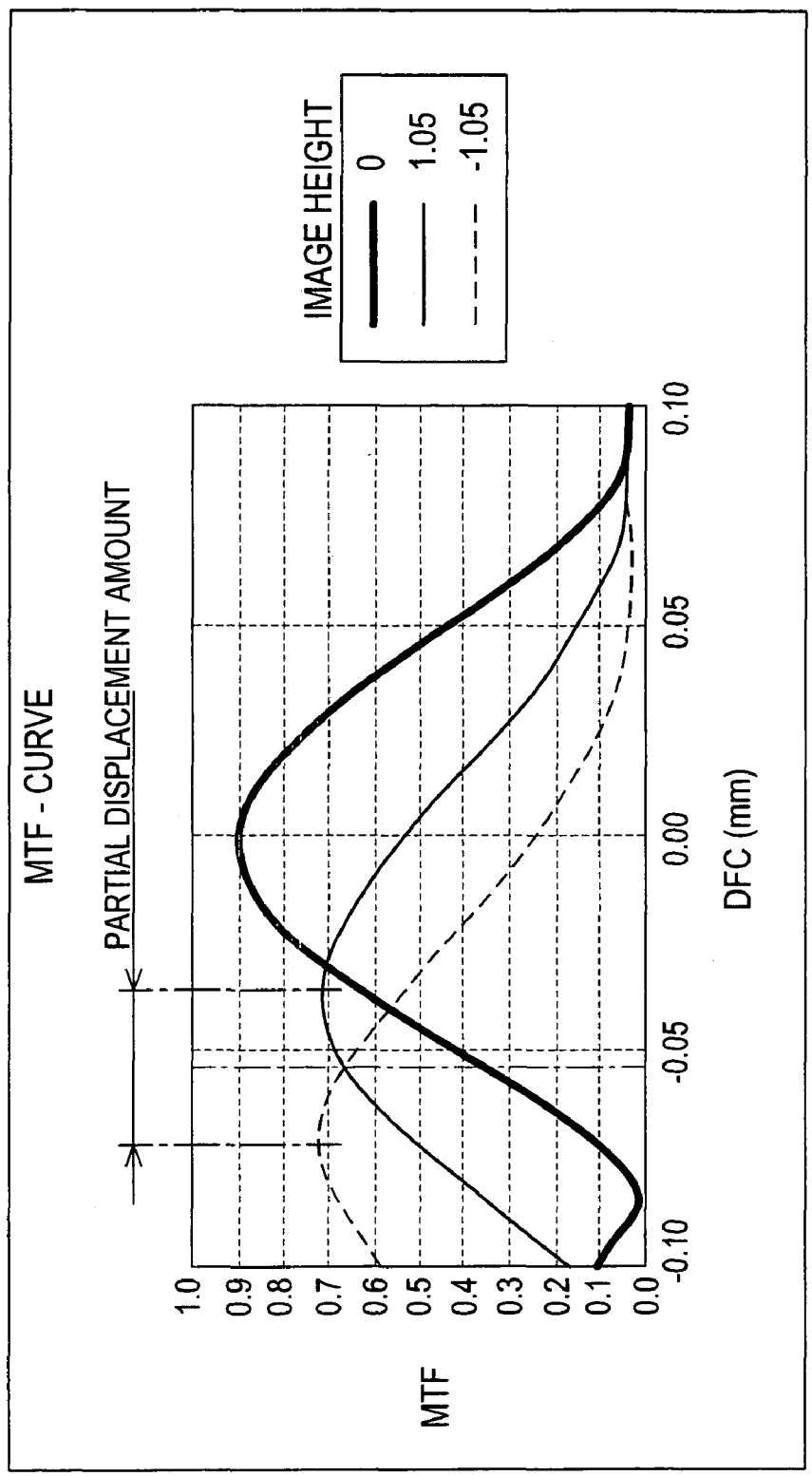
FIG. 15 is a view showing a partial displacement amount which is read out from a MTF curved line.

The lens to be examined was a camera lens for a cellular phone. Before carrying out the examination, a fixed camera cone is prepared, and the lenses other than the lens to be examined were master lenses of which the displacement amount of the optical axis (axial displacement) was 0. As for the measurement of the partial displacement amount, using an MTF (Modulated Transfer Function) measuring equipment, MTF of an image, which is of 70% with respect to the field angle of the camera lens unit was measured. FIG. 15 shows the result of the MTF measurement. The difference of the peak position (focus position) between plus image height and minus image height was read out. The difference was the partial displacement amount.

Figure 16:
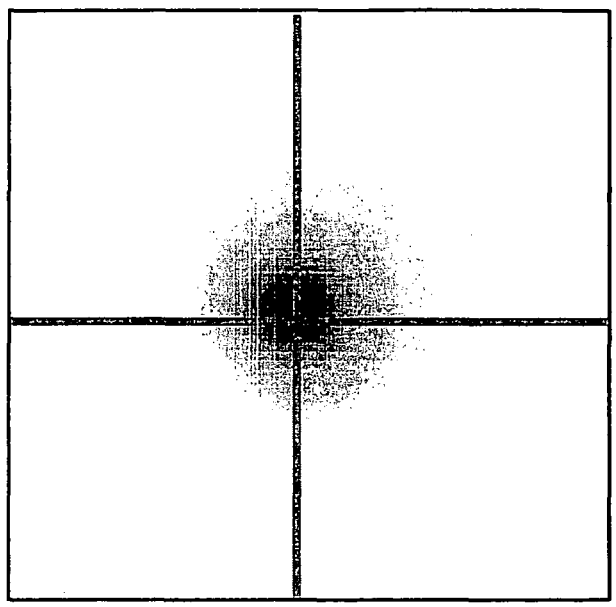
FIG. 16 is a view showing an axial coma for an axial displacement of 3 μm.
Figure 17:
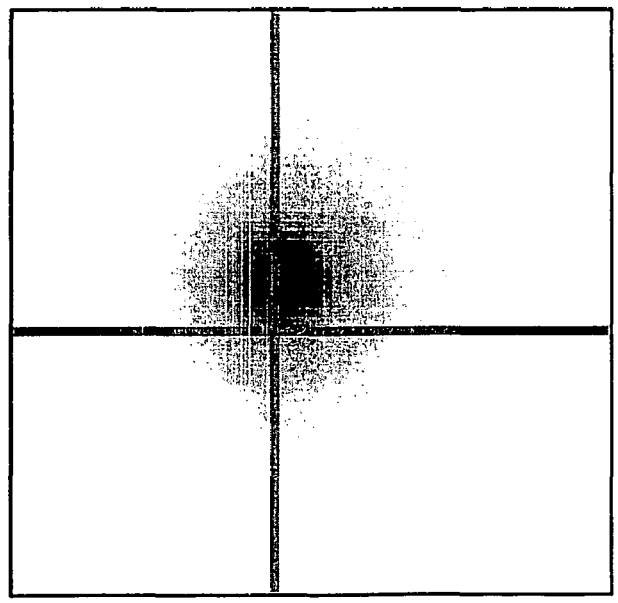
FIG. 17 is a view showing an axial coma for an axial displacement of 8 μm.
Figure 18:
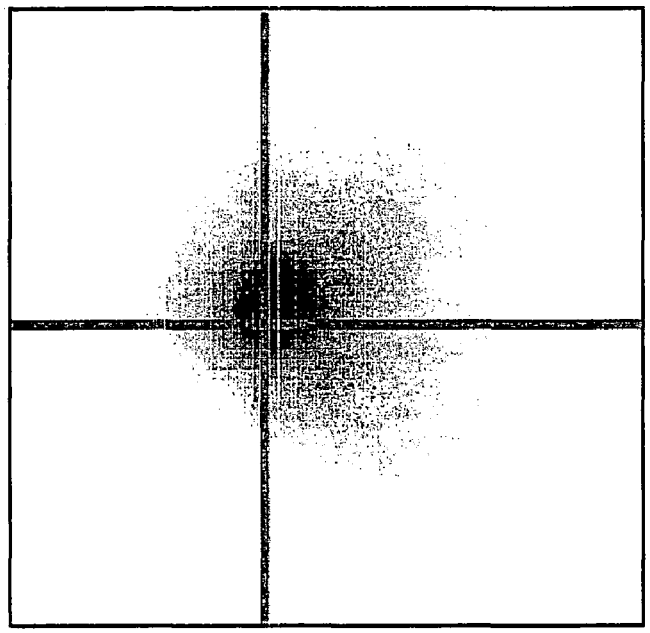
FIG. 18 is a view showing an axial coma for an axial displacement of 15 μm.
Figure 19:
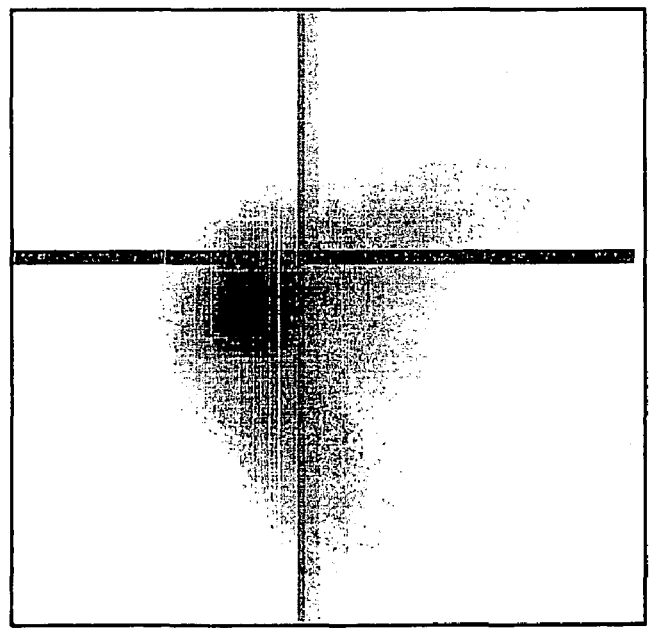
FIG. 19 is a view showing an axial coma for an axial displacement of 22 μm.

In the examination, light from a point light source of 500 nm was allowed to enter into the camera lens unit, and the point image thereof was observed using an objective lens of 40 magnifications. The examination results of point image and partial displacement amount of every axial shift length will be described below. FIG. 16 shows the partial displacement amount when the axial displacement was 3 µm; FIG. 17 shows the partial displacement amount when the axial displacement was 8 µm; FIG. 18 shows the partial displacement amount when the axial displacement was 15 µm; and FIG. 19 shows the partial displacement amount when the axial displacement was 22 µm.

When the axial displacement was 3 µm, the point image was focused into a substantially concentric circular shape as shown in FIG. 16, and the partial displacement amount was approximately 10 µm. When the axial displacement was 8 µm, compared with FIG. 16, the point image was deformed as shown in FIG. 17, and the partial displacement amount was approximately 30 µm. When the axial displacement was 15 µm, compared with FIG. 17, the point image was further deformed as shown in FIG. 18, and the partial displacement amount was approximately 40 µm. When the axial displacement was 22 µm, the configuration of the point image was largely deformed as shown in FIG. 19, and the optical characteristics were largely degraded.

As a result, in the camera lens for a cellular phone, which requires a high precision (optical component of which the outer diameter was 12 mm or less and the surface roughness Ra of the optical surface was 20 nm or less), it was found that, when the axial displacement was 22 µm or more, the degradation of the optical characteristics was too large and was not acceptable as a product. Therefore, it was found that the axial displacement in the direction perpendicular to the clamping direction had to be 20 µm or less, preferably, 10 µm or less. Further, it was found that, to provide a high precision optical component, the axial displacement had to be 5 µm or less.

[Application Example to Optical Pick Up Device]

Next, an application example of a plastic lens, which is molded with the molding machine 100 of the embodiment, to an optical pick up device will be described. In this specification, optical disks, which use blue-violet semiconductor laser or blue violet SHG laser as a light source for recording/reading information, will be generally referred to as a "high density optical disk." In addition to a standard optical disk in which information is recorded/read with an objective optical system of NA 0.85, and the thickness of the protective layer thereof is approximately 0.1 mm, the high density optical disk includes a standard optical disk in which information is recorded/read with an objective optical system of NA 0.65, and the thickness of the protective layer thereof is approximately 0.6 mm. Further, in addition to the above optical disks, which have the above described protective layer over the information recording surface, there are included the following optical disks i.e., an optical disk which has a protective film of several nm to several dozen nm in thickness over the information recording surface, and an optical disk in which the thickness of the protective layer or protective film is 0. Furthermore, in this specification, the high density optical disk also includes a magnetic optical disk using a blue-violet semiconductor laser or a blue-violet SHG laser as the light source for recording/reading information.

The optical pick up device of the embodiment is an optical pick up device supporting 3 formats of a high density optical disk, DVD and CD, which utilize, a so called blue violet laser light source of which the effective wavelength is 405 nm. There is included, as a first optical information recording medium, a high density optical disk having a protection substrate of 0.6 mm in thickness t1; as a second optical information recording medium, a DVD having a protection substrate of 0.6 mm in thickness t2; and as a third optical information recording medium, a CD having a protection substrate of 1.2 mm in thickness t3. Reference symbol D0 in FIG. 20 denotes a surface on which the protection substrate of the recording medium is placed. The positional relationship between the surface D0 and the light source does not change depending on the kind of recording medium. Here, the thickness from D0 to D1, D2 or D3 is the thickness of the substrate, respectively.

In this specification, the "DVD" is a generic name for optical 21 disks included in the DVD family such as DVD-ROM, DVD-Video, DVD-Audio, DVD-RAM, DVD-R, DVD-RW, DVD+R, and DVD+RW. And the "CD" is a general name of optical disks included in the CD family such as CD-ROM, CD-Audio, CD-Video; CD-R, and CD-RW.

Figure 20:
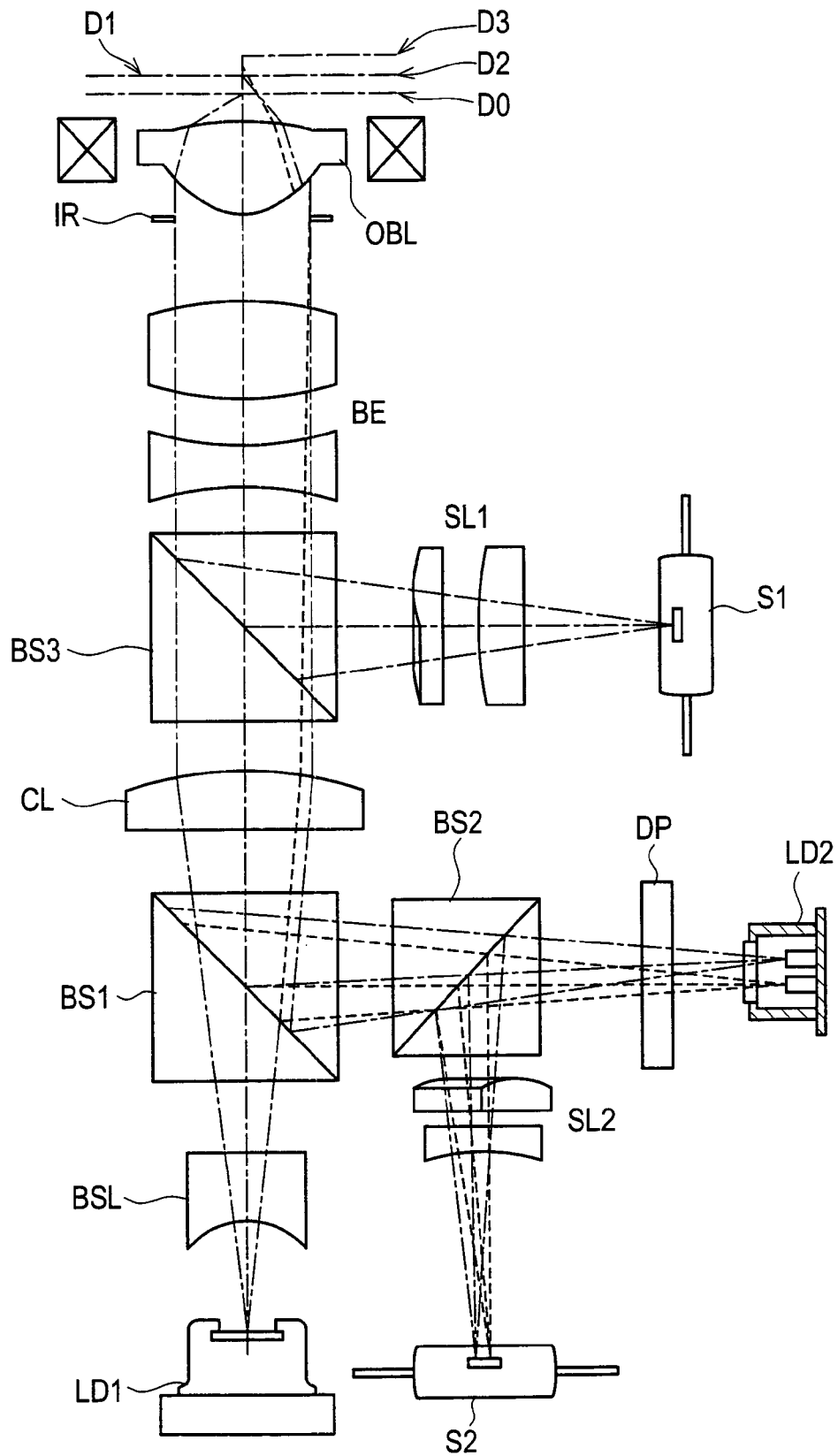
FIG. 20 is a view showing a structure of an optical pick-up device in the embodiment.

[In FIG. 20, the laser diode LD1 is a first light source using a blue violet laser of 405 nm in wavelength $\lambda$1. However, a laser within a range of 390 nm to 420 nm in wavelength may be appropriately employed. The laser diode LD2 is a second light source using a red laser of 655 nm in wavelength λ2. However, a laser within a range of 630 nm to 680 nm in wavelength may be appropriately employed. The laser diode LD3 is a third light source using an infrared laser of 780 nm in wavelength 3. However, an infrared laser within a range of 750 nm to 800 nm in wavelength may be appropriately employed.

The laser diode LD2 is a light source unit of, a so called 2-laser in 1-package, in which two luminous points of the second light source (light source for DVD) and the third light source (light source for CD) are included in the same package.

The solid line from the laser diode LD2 indicates a light beam for a DVD, and the broken line indicates a light beam for a CD. A beam splitter BS1 allows the light beam entered from the laser diode LD1 and LD2 to propagate toward the OBL as the objective optical element.

The light beam emitted from the laser diode LD1 enters into a beam shaper BSL in order to increase the beam quality, and then enters into a collimator CL through a beam splitter BSI; thereby the light beam is collimated into an infinite parallel beam. And then, the light beam propagates through a beam splitter BS3 and further a beam expander BE constituted of a concave lens and a convex lens, and enters into an objective lens OBL (optical element closest to optical disk) as an objective optical element. The light beam forms a focused spot on the information recording surface via the protection substrate of the first optical information recording medium. Then, after being reflected at the information recording surface, the light beam propagates through the same path and passes through the collimator CL1, and the light beam is focused at sensor S1 through a sensor lens SL1 by the beam splitter BS3. And there, the light beam is converted into electric signals.

Between the beam expander BE and the objective lens OBL, an unshown λ/4 (a quarter wavelength) plate is disposed. The direction of polarization is changed so that the phase of the returned light beam is changed by just a half of a wavelength of the forward light beam. Accordingly, the propagation direction of the returned light beam is turned by the beam splitter BS3.

The beam shaper BSL has different curvatures with respect to two directions; i.e., a certain direction perpendicular to the optical axis and the direction perpendicular to that direction and to the optical axis (rotational asymmetrical curvature with respect to the optical axis).

Due to the structure of the semiconductor light source, the light beam emitted from the light source has different divergent angles with respect to two directions; i.e., a certain direction perpendicular to the optical axis and the direction perpendicular to this direction and to the optical axis. And the light beam emitted from the light source is a beam of elliptic shape viewed from the direction of the optical axis. Therefore; the light beam emitted from the light source, as it is, is not suitable for the light beam of the light source for an optical disk. Therefore, by subjecting the emitted light beam to refraction in directions different from the respective directions through the beam shaper BSL it transforms into a beam having a substantially circular section.

Here, the beam shaper BSL is disposed in the optical path of the laser diode LD1. However, as a matter of course, the beam shaper BSL may be disposed in the optical path of the laser diode LD2. Same as the case of the laser diode LD1, the light beam emitted from the laser diode LD2 also forms a focused spot on the optical disk (second optical information recording medium or third optical information recording medium), and is reflected to finally focus on the sensor S2. Excepting a point where the optical path is made to coincide by the beam splitter BS2, the case of the laser diode LD2 is identical to the case of the laser diode LD1. In FIG. 20, the objective optical element OBL is a single lens but if necessary, the objective optical element OBL may be structured of a plurality of optical elements.

There is shown a state in which light beams emitted from each laser diode LD are condensed on the information recording surface via the protection substrate of the optical disk. The distance between the light source and the surface of the protection substrate is not changed irrespective of the standard for the recording medium to be recorded/read. The basic position (reference position) of the objective optical element is changed by an actuator and focusing is carried out from the reference position.

Depending on the thickness of the protective substrate of each optical information recording medium and the size of the pit, the number of aperture required for the objective optical element OBL also differs. Here, the number of aperture for a CD is 0.45; and the number of aperture for a DVD and high density optical disk is 0.65. However, the number of aperture for a CD is appropriately selectable within a range of 0.43 to 0.50; and the number of aperture for a DVD is appropriately selectable within a range of 0.58 to 0.68.

Reference symbol IR indicates an aperture for blocking unnecessary light. A parallel light beam enters into the objective lens OBL. However, there may be employed such a structure that finite divergent light enters into the objective lens OBL without being collimated. These optical elements shown in FIG. 20 are plastic optical components molded with the molding machine 100 of the embodiment.

The molding machine 100 of the embodiment shown in FIG. 20 molds the objective optical element OBL having a diffraction structure, which is disposed in the common optical path of the first light source, the second light source and the third light source. The objective optical element OBL is formed with a diffraction structure of a sawtooth like shape.

The diffraction structure is a structure such that minute steps are formed in a manner of concentric circles around the optical axis. Light beams, which have passed through the neighboring circular zones; are given with a predetermined optical path difference. By setting the pitch (diffraction power) and the depth (blazed wavelength) of a sawtooth shape, with respect to the high density optical disk, the light beam from a first light source within a specific NA is formed into a focused spot of a secondary diffraction light. And with respect to the DVD, the light beam from the second light source within the same NA is formed into a focused spot of a primary diffraction light.

By using light beams with a diffraction order different from each other, each diffraction efficiency can be increased and thus, sufficient light intensity can be ensured. Also, with respect to the CD, it is preferred that the light beam from the third light source within the same NA is turned into diffraction light of the same order (primary) as that of the DVD. However, the light beam may be turned into diffraction light of an appropriate different order. In this case, it is arranged so that the focused spot is formed as a primary diffraction light same as that of the DVD.

In this specification, the "diffraction structure" means a structure constituted of a plurality of circular zones having a sawtooth or step like shape disposed around the optical axis. However, the "diffraction structure" is differentiated from an "overlapped diffraction structure," in which each of the circular zones is further segmented into a step like shape. In particular, the "overlapped diffraction structure" means the following structure. That is, in the plurality of circular zones of the sawtooth or step like shape disposed around the optical axis, each of the circular zones is further segmented into a step like shape by a plurality of discontinuous steps in the direction of the optical axis. By appropriately setting the step amount A and step number N of the overlapped diffraction structure, it is possible to selectively allow only one light beam of a specific wavelength from the light beams of various wavelengths to be diffracted and allows the light beams of other wavelengths to pass through without being diffracted. Also, it is possible to change the diffraction order of the plural light beams of various wavelengths or, to largely reduce the diffraction efficiency of a light beam of a specific wavelength in a plurality of incoming beams having different wavelengths.

The above diffraction structures are an example of the optical-path difference imparting structure. In addition to them, "phase difference imparting structure" or "multi level structure," which are well known in the art, may be employed. The multi-level structure is a configuration such that a step-like configuration having a predetermined number of steps is repeated periodically. The number, the height of the step and the width (pitch) of the steps can be selected appropriately.

Here, in order to correct the spherical aberration due to the difference in the thickness of the substrate of the optical disk format, the optical-path difference imparting structure is employed. As a matter of course, not limited to the above, the optical path difference imparting structure may be employed to correct aberration generated due to a difference in the wavelength or changes (mode hop) in the used light beam. In the former case, spherical color aberration due to the difference in the wavelength of 50 nm or more can be corrected. In the latter case, minute changes in the wavelength of 5 nm or less can be corrected.

In the above examples, there was described an example of the diffraction structure provided on the objective optical element. As a matter of course, the diffraction structure may be provided to other elements such as a. collimator or bond lens. It is most preferred to apply the above described material to the optical elements, which have a refractive surface or an aspherical surface.

As described above in detail, the molding machine 100 of the embodiment is a micro molding machine of which the mold clamping force is 150 KN or less for producing optical components required with high precision. Since the mold clamping force is 150 KN or less, the strain, which is unavoidably generated by clamping and separating away the molds, is small. Therefore, the positional displacement due to strain is also small. Further, it is adapted so that, after the movable mold 2 is separated away from the fixed mold 1 and then brought into close contact with each other again, the maximum value of the displacement amount between the molds in the direction perpendicular to the clamping direction is ±20 μm or less Accordingly, the molding machine 100 of the embodiment repeatedly performs mold clamping with high precision. That is, the axial displacement of the optical axes between the fixed mold 1 and the movable mold 2 is small.

Also, the molding machine 100 of the embodiment is arranged so that the position between the base mold and the cavity or the position between the cavity and the core can be adjusted. Owing to this, the absolute positional displacement between the fixed mold 1 and the movable mold 2 can be adjusted. This positional adjustment function is provided to at least either one of the fixed mold 1 and the movable mold 2. Owing to this, it is possible that the shape transferring section for forming the optical surface is segmented as the core, and the positional adjustment is carried out on each of the shape transferring sections independently. Therefore, even in the case of the molds for multi molding, it is possible to carry out the positional adjustment on each shape transferring section. Accordingly, even in the case of the molds for multi molding, with respect to every molding item, the axial displacement can be limited to less than 20 μm. Thus, the multi molding of at least four items is possible resulting in highly efficient production.

Further, compared with the molds of the 500 KN class, the size of the molds mounted on the molding machine 100 of the embodiment is compact. Accordingly, the space for installing the molding machine 100 is small. Furthermore, since the molding time is short, the resin amount required for injection is small, and the power required for moving the mold is small etc., the cost can be reduced. Thus, the molding apparatus for optical components, which is capable of molding small size resin optical components with high precision and high efficiency, is achieved.

The above embodiment is given as just an example only accordingly, the present invention is not limited thereto. Therefore, the present invention may be modified or changed variously without departing from the scope of the present invention. The injecting section is not limited to the pre-plasticating type injection machine or the in line screw type injection machine. For example, in line plunger type injection machine may be employed.

As for the optical component as the item to be molded, when the plastic resin as the base material is mixed with fine particles, the mixing method thereof is not particularly limited. Any of the following methods may be employed. That is, a method in which, after the plastic resin and the fine particles are prepared independently, both are mixed with each other a method in which the plastic resin is prepared under such a condition that prepared fine particles are included a method in which the fine particles are prepared under such a condition that plastic resin is existing a method in which both of the plastic resin and the fine particles are prepared simultaneously etc. In particular, there is an appropriate method in which, for example, two solutions of a solution in which the plastic resin is solved and a solution in which the fine particles are uniformly dispersed are mixed uniformly thus, by mixing the plastic resin, which is poor in solubility, with a solution, an intended composition of matters is obtained. However, the mixing method is not limited to the above.

Additionally the mixing level between the plastic resin and the fine particles in the optical component is not particularly limited. However, it is preferred that both are mixed uniformly. In the case where the level of mixing is insufficient, particularly, the optical characteristics such as refractive index, Abbe's number and transmission of a light beam may be influenced. And further, the processing performance of the resin such as thermal plasticity, molten plasticity and the like may be influenced. Since the level of mixing may be influenced by the preparation method thereof, an appropriate method should be selected while taking into consideration the characteristics of the plastic resin and the fine particles. In order to uniformly mix both of the plastic resin and the fine particles, a method in which the plastic resin and the fine particles are directly combined may be appropriately employed.

Plastic, resins suitable for a plastic lens molded with the molding machine of the present invention and inorganic particles to be added to the resins will be described in detail.

Addition amount of inorganic particles to the plastic material may be appropriately adjusted while considering the required performance. Although the addition amount is not particularly limited, it is preferred that, with respect to the total weight, the addition amount of the inorganic particles is 5 to 80 weight %. The reason for this is as described below. That is, after adding nano level inorganic particles to the plastic resin, when carrying out the injection molding to obtain the optical element, if the addition amount of the inorganic particles is lower than the above range, satisfactory improvement of the performance (improvement in athermal performance) cannot be obtained. Contrarily, if the addition amount exceeds the above range, the molding performance may be worsened or the weight as the optical element may be increased thus the performance as the resin material (molding material) may be decreased. Further, there may occur such a problem as burn around the particles during molding.

The effect of the athermal performance differs depending on the dn/dt (changes in refractive index due to temperature changes) value of the inorganic particles. By adding inorganic particles by 5 weight % or more, an improvement effect. of the athermal performance is obtained. When inorganic particles such as PLZT, $LiNbO_3$ or the like are used, by adding the same by 5 weight % or more, dn/dt of the resin can be reduced by about 10% or more. Owing to this, the necessity to compensate changes in aberration due to the temperature changes is decreased. Therefore, the degree of freedom in optical design can be increased.

On the other hand, by controlling the addition amount of the inorganic particles to 80 weight % or less, the specific gravity can be prevented from increasing. Particularly, in the case where the optical element is driven within the optical pick up device, the power consumption of the driving member (actuator) due to the increase in the weight can be prevented, and thus, the high temperature due to the increase in power consumption can be prevented from being generated.

Further, in the optical element, by adjusting the addition amount of the inorganic particles, do/dt value of the resin can be inverted. That is, it is possible to adapt so that the refractive index increases as the temperature of the optical element rises. For example, when inorganic particles of LiNb03 are dispersed. into acrylic resin, by controlling the addition amount of the inorganic particles to 40 weight % or more, the sign of the dn/dt value of the acrylic resin can be inversed. The optical element 15 which has a structure as described above, may provide over compensation with respect to the temperature changes. By combining with optical elements of ordinary resin, the mutual changes in refractive index due to the temperature changes can be balanced out. As described above, even when all of the optical elements in the optical system are not subjected to athermal processing, by processing a part of the optical, elements so as to be over compensated, in the entire system, the changes in refractive index due to the temperature changes can be balanced out.

The resin material as the base material of the optical element can be obtained by, for example, dispersing fine particles of niobium oxide (Nb206) into the acrylic resin. The volume percent of the thermal plastic resin as the base material is about 80 and that of the niobium oxide is about 20 and the both are mixed uniformly. Although the fine particles have such a disadvantage as being easy to agglutinate, using a technique to charge the surface of the particles to disperse, the fine particles can be adequately dispersed.

Preferably, the fine particles added to the resin material are of an inorganic substance. However, oxide is further preferable. And, it is preferred that the oxidation state is saturated and the oxidation does not proceed any more.

In particular, the mean particle diameter of the fine particles is 30 nm or less, but preferably 1 nm or more. When the mean particle diameter is less than 1 nm, the particles are hardly dispersed, and desired performance may not be obtained. When the mean particle diameter exceeds 30 nm, the obtained composition of matter for the thermal plasticity material may lose its clearness resulting in a poor transparency, and the transmission of the light beam may be reduced to less than 70%. Here, the "mean particle diameter" means the diameter of the particles being converted into a ball of the same volume.

The configuration of the inorganic fine particles is not particularly limited, but it is preferred that spherical fine particles are employed. The distribution of the diameter of the particles is not particularly limited. However, the particles having a relatively narrow distribution are preferred to those having a wide distribution.

As for inorganic fine particles, for example, oxide fine particles are given. In particular, for example, titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide, lead oxide lithium niobate, potassium niobate, lithium tantalate, and the like, which are double oxide constituted of these oxides and phosphate, sulfate and the like constituted of a combination of these oxides are given preferably.

Also, as for the inorganic fine particles, preferably, fine particles of a semiconductor crystal composition may be employed. The semiconductor crystal compositions are not particularly limited, but the semiconductor crystal compositions, which do not cause absorption, emission, fluorescence and the like within a wavelength range in which the same is used as the optical element are preferable. As for examples of particular components, the following are given i.e., elements in the fourteenth group of the periodic table such as carbon, silicon, germanium and tin elements in the fifteenth group of the periodic table such as phosphorus (black phosphorus); elements in the sixteenth group of the periodic table such as selenium and tellurium compounds consist of a plurality of elements in the fourteenth group of the periodic table such as silicon carbide (SiC); compounds consist of elements in the fourteenth group in the periodic table and elements in the sixteenth group of the periodic table such as tin(IV) oxide ($SnO_2$), tin(II, IV) sulfide (Sn(II) Sn(IV)$S_3$), tin(IV) sulfide ($SnS_2$), tin(II) sulfide (SnS), tin(II) selenide (SnSe), tin(II) telluride (SnTe), lead(II) sulfide (PbS), lead(II) selenide (PbSe) and lead(II) telluride' (PbTe); compounds of elements in the thirteenth group of the periodic table and elements in the fifteenth group of the periodic table (or III-V family compound semiconductors) such as boron nitride (BN), boron phosphide (BP), boron arsenide (BAs), aluminum nitride (AlN), aluminum phosphide (AlP), aluminum arsenide (AlAs), aluminum antimonide (AlSb), gallium nitride (GaN), gallium phosphide (GaP), gallium arsenide (GaAs), gallium antimonide (GaSb), indium nitride (InN), indium phosphide (InP) and indium arsenide (InAs), indium antimonide (InSb); compounds of elements in the thirteenth group of the periodic table and elements in the sixteenth group of the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$) and indium telluride ($In_2Te_3$); compounds of elements in the twelfth group of the periodic table and elements in the sixteenth group of the periodic table (or compound semiconductors of II-VI family) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of elements in the fifteenth group of the periodic table and elements in the sixteenth group of the periodic table such as arsenic(III) sulfide ($As_2S_3$), arsenic(III) selenide ($As_2Se_3$), arsenic(III) telluride ($As_2Te_3$), antimony (III) sulfide ($Sb_2S_3$), antimony(III) selenide ($Sb_2Se_3$), antimony(III) telluride ($Sb_2Te_3$), bismuth(III) sulfide ($Bi_2S_3$), bismuth(III) selenide ($Bi_2Se_3$) and bismuth (III) telluride ($Bi2Te_3$); compounds of elements in the eleventh group of the periodic table and elements in the sixteenth group of the periodic table such as copper(I) oxide ($Cu_2O$) and copper(I) selenide ($Cu_2Se$); compounds of elements in the eleventh group of the periodic table and elements in the seventeenth group of the periodic table such as copper(I) chloride (CuCl), copper(I) bromide (CuBr), copper(I) iodide (Cup, silver chloride (AgCl) and silver bromide (AgBr); compounds of elements in the tenth group of the periodic table and elements in the sixteenth group of the periodic table such as nickel(II) oxide (NiO); compounds of elements in the ninth group of the periodic table and elements in the sixteenth group of the periodic table such as cobalt(II) oxide ($C_oO$) and cobalt(II) sulfide (CoS); compounds of elements in the eighth group of the periodic table and elements in the sixteenth group of the periodic table such as triiron tetraoxide ($Fe_3O_4$) and iron(II) sulfide (FeS); compounds of elements in the seventh group of the periodic table and elements in the sixteenth group of the periodic table such as manganese(II) oxide (MnO); compounds of elements in the sixth group of the periodic table and elements in sixteenth group of the periodic table such as molybdenum(IV) sulfide ($MoS_2$) and tungsten(IV) oxide ($WO_2$); compounds of elements in the fifth group of the periodic table and elements in the sixteenth group of the periodic table such as vanadium(II) oxide (VO), vanadium(IV) oxide ($VO_2$) and tantalum(V) oxide ($Ta_2O_5$); compounds of elements in the fourth group of the periodic table and elements in sixteenth group of the periodic table such as titanium oxide ($TiO_2$, $Ti_2O_5$, $Ti_2O_3$, $Ti_5O_9$ etc.); compounds of elements in the second group of the periodic table and elements in the sixteenth group of the periodic table such as magnesium sulfide (MgS) and magnesium selenide (MgSe); chalcogen spinels such as cadmium(II) chromium(III) oxide ($CdCr2O4$), cadmium(II) chromium(III) selenide ($CdCr_2Se_4$), copper(II) chromium(III) sulfide ($CuCr_2S_4$) and mercury(II) chromium (III) selenide ($HgCr_2Se_4$) and barium titanate ($BaTiO_3$). Semiconductor clusters, of which the structure is decided, such as $Cu_{146}Se_{73}$ (triethylphosphine)$_{22}$ reported in Adv. Mater., Vol 4, p. 494 (1991): G. Schmid et al, is also given. As for the fine particles, one kind of inorganic fine particle may be used or 20 plural kinds of inorganic fine particles may be used together.

Since the reaction with the plastic resin as a high polymer organic compound can be reduced to a low level, inorganic substance is preferred. Also, oxide can prevent degradation accompanying the use. Particularly, under such severe conditions as being exposed to a high temperature and laser radiation, the oxidation is accelerated. Fine particles of inorganic oxide as listed above can be prevented from degradation due to the oxidation. Further, in order to prevent the resin from being oxidized due to other causes, preferably, an antioxidant may be added.

The processing method of the inorganic fine particles is not particularly limited, but any method well known in the art may be employed. For example, by carrying out hydrolysis in a reaction system including water using metal halide or alkoxy metal as the material, desired oxide fine particles can be obtained. Here, a method in which organic acid, organic amine or the like may be used together for stabilizing the fine particles.

Further, it is preferred that the inorganic fine particles are processed with surface modification. The method of surface modification is not particularly limited. Any method well known in the art may be employed. For example, a method in which hydrolysis is carried out under conditions including water to modify the surface of the inorganic fine particles is given. In this method, the following is generally employed. That is, a catalyst such as acid or alkali is appropriately used and hydroxyl on the fine particle surfaces and hydroxyl generated by hydrolysis of the surface modification agent are dehydrated to form a bond.

Figure 21:
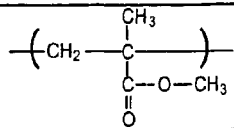
FIG. 21 is a table showing concrete examples of plastic resins used in the embodiment.
Figure 21:
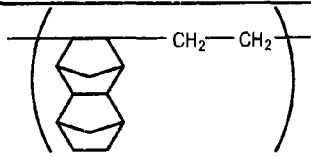
Figure 21:
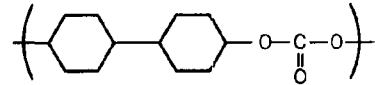
Figure 21:
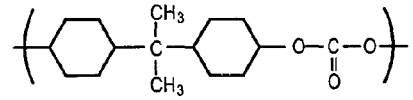
Figure 21:
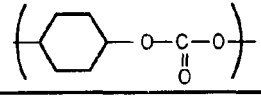
Figure 21:
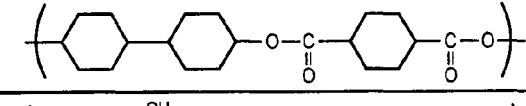
Figure 21:
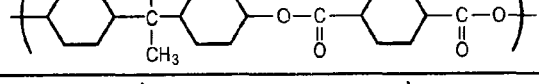
Figure 21:
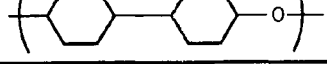
Figure 21:
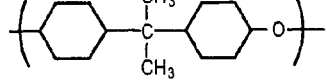
Figure 21:
Figure 21:
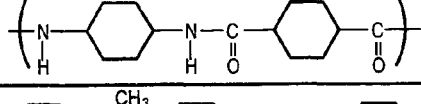
Figure 21:
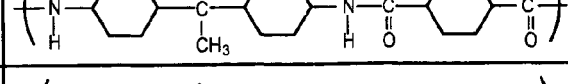
Figure 21:
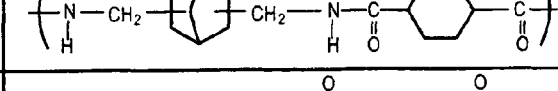
Figure 21:
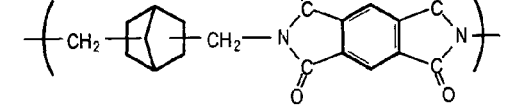

Next, the plastic resin will be described in detail below. As for the plastic resin, as described above, acrylic resin, cyclic olefin resin, polycarbonate resin, polyester resin, polyether resin, polyamide resin, polyimide resin and the like are given. As for the plastic resin used for the optical element, particularly, a polymer having an alicyclic structure is preferably used. Particularly, an acrylic resin, polycarbonate resin having a cyclic aliphatic chain, polyester resin having a cyclic aliphatic chain, polyether resin having a cyclic aliphatic chain, polyamide resin having a cyclic aliphatic chain, polyimide resin having a cyclic aliphatic chain and the like are preferably given. More particularly, for example, resins, which have a structure expressed with chemical formulas (3) to (16) listed in table 1 in FIG. 21, are given but not limited thereto.

As for the polymer having an alicyclic structure, an alicyclic hydrocarbon copolymer, in which, in the entire repeated unit of the polymer, repeated unit (a) having an alicyclic structure expressed with the following general formula (1) and repeated unit (b) of chain structure expressed with the following general formula (2) and/or general formula (3) are included so that the total content is 90 weight % or more, and the content of the repeated unit (b) is 1 to less than 10 weight %, is further preferred.

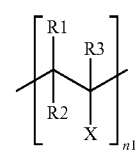

[Chemical formula 1]

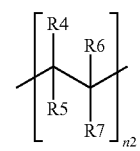

[Chemical formula 2]

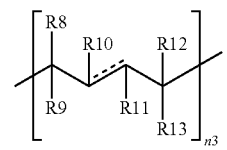

[Chemical formula 3]

In Chemical formula 1, "X" denotes an alicyclic hydrocarbon group. In Chemical formulas (1), (2), and (3), "R1" to "R13" denote a hydrogen atom, chain hydrocarbon group, halogen atom, alkoxy group, hydroxy group, ether group, ester group, cyano group, amide group, imide group, silyl group, and chain hydrocarbon group substituted by a polar group (halogen atom, alkoxy group, hydroxy group, ether group, ester group, cyano group, amide group, imide group, or silyl group) respectively and independently. In the above, since being superior in heat resistance and low water absorbing property, hydrogen atom or chain hydrocarbon group of carbon atomicity of 1 to 6 is preferred. As the halogen atom, a fluorine atom, chlorine atom, bromine atom, and iodine atom are given. As for the chain hydrocarbon group substituted by a polar group, for example, an alkyl halide of carbon atomicity 1 to 20, preferably 1 to 10, more preferably 1 to 6 is given. As for the chain hydrocarbon group, for example, an alkyl group of carbon atomicity 1 to 20, preferably 1 to 10, more preferably 1 to 6 and an alkenyl group of carbon atomicity 2 to 20, preferably 2 to 10, more preferably 2 to 6 are given.

"X" in the general formula (1) denotes an alicyclic hydrocarbon group, and the number of carbons constituting the same is ordinarily 4 to 20, preferably 4 to 10, more preferably 5 to 7. By controlling the number of carbons constituting an alicyclic structure in this range, the double refraction can be reduced. The alicyclic structure is not limited to a monocyclic structure, but for example, a polycyclic structure such as a norbornane ring and dicyclohexane ring or the like may be employed.

The alicyclic hydrocarbon group may have carbon carbon unsaturated bond but the content thereof is 10% or less, preferably 5% or less, more preferably 3% or less of the entire carbon carbon bond. By controlling the carbon carbon unsaturated bond of the alicyclic hydrocarbon group in the above range, the transparency and heat resistance is increased. The carbons constituting the alicyclic hydrocarbon group may be combined with a hydrogen atom, hydrocarbon group, halogen atom, alkoxy group, hydroxy group, ether group, ester group, cyano group, amide group, imide group, silyl group, and chain hydrocarbon group etc., substituted with a polar group (halogen atom, alkoxy group, hydroxy group, ether group, ester group, cyano group, amide group, imide group, or silyl group). Particularly, a hydrogen atom or chain hydrocarbon group of carbon atomicity of 1 to 6 is preferred on the point of heat resistance and low water absorbing property.

" . . . " in the general formula (3) indicates carbon carbon saturation or unsaturated bond in the main chain. In the case where the transparency and heat resistance is strongly required, the content of the unsaturated bond is ordinarily 10% or less, preferably 5% or less, more preferably 3% or less of the entire carbon carbon bonds constituting the main chain.

In the repeated units expressed with the general formula (1), the repeated unit expressed with the following general formula (4) is superior on the point of heat resistance and low water absorbing property.

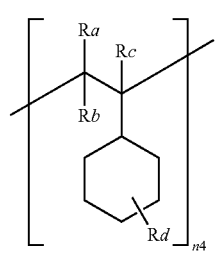

[Chemical formula 4]

In the repeated units expressed with the general formula (2), the repeated unit expressed with the following general formula (5) is superior on the point of heat resistance and low water absorbing property.

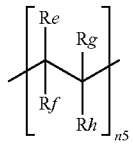

[Chemical formula 5]

In the repeated units expressed with the general formula (3), the repeated unit expressed with the following general formula (6) is superior on the point of heat resistance and low water absorbing property.

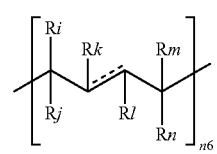

[Chemical formula 6]

Ra, Rb, Rc, Rd, Re, Rf, Rg, Rh, Ri, Rj, Rk, Rl, Rm and Rn in the general formula (4), general formula (5) and general formula (6) indicate a hydrogen atom or a lower chain hydrocarbon group respectively and independently. A hydrogen atom or lower alkyl group with a carbon number of 1 to 6 is superior on the point of heat resistance and low water absorbing property.

In the repeated units of the chain structure expressed with the general formula (2) and the general formula (3), the repeated unit of the chain structure expressed by the general formula (3) is superior in the strength characteristics of the obtained hydrocarbon polymer.

In the hydrocarbon copolymer, the total content of the repeated unit (a) having the alicyclic structure expressed with the general formula (1) and the repeated unit (b) of the chain structure expressed with the general formula (2) and/or general formula (3) is, on the basis of weight, ordinarily 90% or more, preferably 95% or more, more preferably 97% or more. By controlling the total content within the above range, the low double refraction property, the heat resistance, the low water absorbing property and the mechanical strength are balanced at a high level.

In the alicyclic hydrocarbon copolymer, the content of the repeated unit (b) in the chain structure is appropriately selected in accordance with its application. Ordinarily, on the basis of weight, the range is 1% to less than 10%, preferably 1% to 8% or less, and more preferably 2% to 6% or less. When the content of the repeated unit (b) is within the above range, low double refraction property, heat resistance, and low water absorbing property are balanced at a high level.

Also, compared with the chain length of the molecular of the alicyclic hydrocarbon copolymer, the chain length of the repeated unit (a) is satisfactorily short. In particular, assuming that A=(weight average molecular weight of repeated unit chain having alicyclic structure); and B=10 (weight mean molecular amount (Mw) of alicyclic hydrocarbon copolymer×(number of repeated units having alicyclic structure/total number of repeated units constituting alicyclic hydrocarbon copolymer)), A is within a range of 30% or less, preferably 20% or less, more preferably 15% or less, and particularly preferably 10% or less of B. When A is out of this range, the low double refraction property is poor.

Further, it is preferred that the chain length of the repeated unit (a) has a specific distribution. In particular, assuming that A=(weight average molecular weight of repeated unit chain having alicyclic structure); C=(number average molecular weight of repeated unit chain having alicyclic structure), A/C is preferably within a range of 1.3 or more, more preferably 1.3 to 8.0, most preferably 1.7 to 6.0. When A/C is excessively small, the level of block is increased and when A/C is excessively large, the level of random is increased. In any case, the low double refraction property is poor.

On the basis of weight average molecular weight (Mw) converted with polystyrene (or polyisoprene) measured with gel permeation chromatography (referred to as, GPC), the molecular weight of the alicyclic hydrocarbon copolymers is within the range of 1000 to 1000000, preferably 5000 to 500000, more preferably 10000 to 300000, most preferably 50000 to 250000. When the weight average molecular weight (Mw) of the alicyclic hydrocarbon copolymers is excessively small, the molded item is poor in strength property contrarily, when it is excessively large, the double 5 refraction of the molded item is large.

The molecular weight distribution of the copolymer can be appropriately selected according to its application. On the basis of ratio (Mw/Mn) between the weight average molecular weight (Mw) converted with polystyrene (or polyisoprene) measured with GPC and the number average molecular weight (Mn), the molecular weight distribution of the copolymer is ordinarily within a range of 2.5 or less, preferably 2.3 or less, more preferably 2 or less. When Mw/Mn is within the above range, the mechanical strength and heat resistance are balanced at a high level.

The glass transition temperature (Tg) of the copolymer may be appropriately selected in accordance with its application ordinarily 50° C. to 250° C., preferably 70° C. to 200° C., more preferably 90° C. to 180° C.

As for the technique for dispersing particles in the plastic resin, there is known a technique charging the particles. For example, a chamber is filled with pellet type plastic resins, and the particles are injected and dispersed within the chamber and then, the inside of the chamber is heated to melt the plastic resins. Thereby, the dispersed particles are dispersed in the molten plastic resin. Here, in order to prevent the particles from being deposited, the particles may be agitated, or be subjected to electric field, magnetic field or ultrasonic wave.

Another technique, in which, when injecting the molten plastic resin to mold, particles are added using an inline mixer or the like, may be employed. In this case, since the particles are mixed spirally on line, the particles can be preferably dispersed in the plastic resin.

Here, when the plastic resin dispersed with fine particles is once cooled to be solidified and then melted again to inject, by being heated and melted again, the dispersion state may be changed or tiny burns may be generated in the resin around the particles. Therefore, the above is not preferred. Particularly, when burns are generated, depending on the location of the burns, the transmission of the light beam may be decreased and the item cannot be utilized as an optical element. Therefore, it is preferred that, once the plastic resin is melted and the particles are dispersed, the item should be molded while maintaining the state where the plastic resin is melted and the particles are dispersed. That is, it is preferred that, the particles of which the diameter is 30 nanometers or less should be dispersed in the plastic resin in the melted state, and then, being maintained in its melted state, the plastic resin is flown into the molds to obtain the molded item.

What is claimed is:

1. An optical component molding method comprising the steps of:

clamping a fixed mold and a movable mold by bringing the molds into close contact with each other using a mold clamping force of 2 KN to 150 KN;

injecting a resin material into a void formed between the clamped molds while maintaining a clamping force that does not exceed the mold clamping force;

solidifying the resin material injected into the void without increasing the clamping force after injecting the resin material into the void;

separating the movable mold from the fixed mold; and removing the solidified resin material, which forms a plurality of optical components, wherein each optical component has an outer diameter of 12 mm or less and an optical surface having a surface roughness of Ra 20 nm or less.

2. The method according to claim 1, wherein the clamping step, the injecting step, the solidifying step, and the separating step are repeated to sequentially mold the optical components, and in the mold clamping step following the separating step, a maximum value of positional shift length between the movable mold and the fixed mold in a direction perpendicular to a clamping direction is ±20 µm or less.

3. The method according to claim 1, wherein the maximum value of the positional shift length between the movable mold and the fixed mold is ±10 µm or less.

4. The method according to claim 1, wherein the maximum value of the positional shift length between the movable mold and the fixed mold is ±5 µm or less.

5. The method according to claim 1, wherein at least one of the fixed mold and the movable mold is provided, in the transferring section of the optical surface, with a step shaped in a circular zone disposed around an optical axis of the optical component.

6. The method according to claim 1, wherein the mold clamping force for bringing the movable mold and the fixed mold into close contact with each other is within a range of 3 KN to 130 KN.

7. The method according to claim 1, wherein the number of formable optical components in one mold clamping is 32 or less.

8. The method according to claim 1, wherein the number of formable optical components in one mold clamping is in a range of 8 to 16.

9. The method according to claim 1, wherein the optical component to be molded is an element to be used in an imaging system.

10. The method according to claim 1, wherein the optical component to be molded is an element to be used in an optical pick up system.

11. The method according to claim 1, wherein at least one of the fixed mold and the movable mold is constructed of a transferring member for forming the optical surface of the optical component and a face mold that holds the transferring member; and wherein a position of the transferring member is adjustable with respect to the face mold in a direction perpendicular to the clamping direction of the mold.

12. The method according to claim 11, wherein only one of the fixed mold and the movable mold is constructed of a transferring member for forming the optical surface of the optical component and the face mold which holds the transferring member, and the position of the transferring member is adjustable with respect to the face mold in the direction perpendicular to the clamping direction of the mold.

13. The method according to claim 11, wherein the transferring member is inserted in the face mold along the clamping direction of the molds.

14. The method according to claim 11, wherein the transferring member is inserted in one of the fixed mold and the movable mold and the position of the transferring member is adjustable with respect to the fixed mold or the movable mold in which the transferring member is inserted.

15. The method according to claim 11, wherein the transferring member has an outer shape of a circular cylinder.

16. The method according to claim 11, wherein the transferring member has an outer shape of a rectangular rod.

17. The method according to claim 11, wherein the transferring member is formed as a single member.

18. The method according to claim 11, wherein the transferring member comprises:
 a first transferring member provided with a transferring section which forms the optical surface of the optical component; and
 a second transferring member provided with a transferring section which forms a flange portion at a periphery of the optical surface of the optical component.

19. The method according to claim 18, wherein at least one of the first and second transferring members has an outer shape of a circular cylinder.

20. The method according to claim 18, wherein at least one of the first, and second transferring members has an outer shape of a rectangular rod.

21. An optical component molding method comprising the steps of:
 clamping a fixed mold and a movable mold by bringing the molds into close contact with each other using a mold clamping force of 2 KN to 150 KN;
 injecting a resin material into a void formed between the clamped molds while maintaining a clamping force that does not exceed the mold clamping force, the void configured to form at least 4 optical components by injection of the resin material;
 solidifying the resin material injected into the void while without increasing the clamping force after injecting the resin material into the void; and
 separating the moveable mold from the fixed mold; and
 removing the solidified resin material, which forms the at least 4 optical components, wherein each optical component has an outer diameter of 12 mm or less and an optical surface having a surface roughness of Ra 20 nm or less.

22. The method according to claim 21, wherein the clamping step, the injecting step, solidifying step, and the separating step are repeated to sequentially mold the optical components, and in the mold clamping step following the separating step, a maximum value of positional shift length between the movable mold and the fixed mold in a direction perpendicular to a clamping direction is ±20 µm or less.

23. An optical component molding method comprising the steps of:
 clamping a fixed mold and a movable mold by bringing the molds into close contact with each other using a mold clamping force within 2 KN to 150 KN;
 injecting a resin material into a void formed between the clamped molds while maintaining a clamping force that does not exceed the mold clamping force;
 solidifying the resin material injected into the void without increasing the clamping force after injecting the resin material into the void;
 separating the moveable mold from the fixed mold;
 removing the solidified resin material, which forms an optical component;
 wherein each optical component has an outer diameter of 12 mm or less and an optical surface having a surface roughness of Ra 20 nm or less;
 wherein at least one of the fixed mold and the movable mold is constructed of a transferring member configured to form an optical surface of the optical component, and the other of the fixed mold and the movable mold is constructed as a face mold configured to hold the transferring member; and
 wherein a position of the transferring member is adjustable with respect to the face mold in a direction perpendicular to the clamping direction of the mold.

24. An optical component molding method comprising the steps of:
 clamping a fixed mold and a movable mold by bringing the molds into close contact with each other using a mold clamping force of 2 KN to 150 KN;
 injecting a resin material into a void formed between the clamped molds using a pre-plunger type injection machine while maintaining a clamping force that does not exceed the mold clamping force;
 solidifying the resin material injected into the void without increasing the clamping force after injecting the resin material into the void;
 separating the moveable mold from the fixed mold;
 removing the solidified resin material to form a plurality of optical components, each of which has an outer diameter of 12 mm or less and an optical surface having a surface roughness of Ra 20 nm or less; and
 wherein the pre-plunger type injection machine has a screw with a diameter of 10 to 30 mm, a plunger with diameter of 8 to 20 mm, an (L/D) ratio of 20 to 30 calculated by dividing an effective length L of the screw by an outer diameter D of the screw, and a compression ratio of 2 to 3.

25. An optical component molding method comprising the steps of:
 clamping a fixed mold and a movable mold by bringing the molds into close contact with each other using a mold clamping force of 2 KN to 150 KN;
 injecting a resin material into a void formed between the clamped molds using an in-line screw type injection machine while maintaining a clamping force that does not exceed the mold clamping force;
 solidifying the resin material injected into the void without increasing the clamping force after injecting the resin material into the void;
 separating the fixed mold from the movable mold;
 removing the solidified resin material to form a plurality of optical components, each of which has an outer diameter of 12 mm or less and an optical surface having a surface roughness of Ra 20 nm or less; and
 wherein the pre-plunger type injection machine has a screw with a diameter of 10 to 30 mm, a plunger with diameter of 8 to 20 mm, an (L/D) ratio of 20 to 30 calculated by dividing an effective length L of the screw by an outer diameter D of the screw, and a compression ratio of 2 to 3.

26. The method according to claim 25, wherein only one of the fixed mold and the movable mold is constructed of a transferring member for forming the optical surface of the optical component and the face mold which holds the transferring member, and the position of the transferring member is adjustable with respect to the face mold in the direction perpendicular to the clamping direction of the mold.

27. An optical component molding method comprising:
clamping a fixed mold and a movable mold by bringing the molds into close contact with each other using a mold clamping force of 2 KN to 150 KN, wherein the clamping force does not exceed an initial clamping force throughout an entire molding process;
injecting a resin material into a void between the clamped molds;
solidifying the resin material injected into the void;
separating the movable mold from the fixed mold; and
removing the solidified resin material, which forms a plurality of optical components, wherein each optical component has an outer diameter of 12 mm or less and an optical surface having a surface roughness of Ra 20 nm or less.

28. The method according to claim 27, wherein the void configured to form at least 4 optical components by injection of the resin material, and wherein the formable number of optical components in one mold clamping is 4 or more.

29. An optical component molding method comprising:
clamping a fixed mold and a movable mold by bringing the molds into close contact with each other using a mold clamping force of 2 KN to 150 KN;
injecting a resin material into a void between the clamped molds;
solidifying the resin material injected into the void without increasing the clamping force after injecting the resin material into the void;
separating the movable mold from the fixed mold; and
removing the solidified resin material, which forms a plurality of optical components, wherein each optical component has an outer diameter of 12 mm or less and an optical surface having a surface roughness of Ra 20 nm or less.

30. The method according to claim 29, wherein the void is configured to form at least 4 optical components by injection of the resin material, and wherein the formable number of optical components in one mold clamping is 4 or more.

* * * * *